United States Patent
Souders

(10) Patent No.: US 11,720,474 B2
(45) Date of Patent: Aug. 8, 2023

(54) SYSTEM AND METHODS FOR POST MORTEM DEBUGGING OF TRANSFORMED BINARIES

(71) Applicant: RUNSAFE SECURITY, INC., McLean, VA (US)

(72) Inventor: Mitchell Lee Souders, Wilsonville, OR (US)

(73) Assignee: RUNSAFE SECURITY, INC., McLean, VA (US)

(*) Notice: Subject to any disclaimer, the term of this patent is extended or adjusted under 35 U.S.C. 154(b) by 0 days.

(21) Appl. No.: 17/557,403

(22) Filed: Dec. 21, 2021

(65) Prior Publication Data
US 2022/0197778 A1    Jun. 23, 2022

Related U.S. Application Data

(60) Provisional application No. 63/128,326, filed on Dec. 21, 2020.

(51) Int. Cl.
| | |
|---|---|
| *G06F 11/36* | (2006.01) |
| *G06F 7/58* | (2006.01) |
| *G06F 11/07* | (2006.01) |

(52) U.S. Cl.
CPC ......... *G06F 11/3636* (2013.01); *G06F 7/588* (2013.01); *G06F 11/0772* (2013.01); *G06F 11/0778* (2013.01); *G06F 11/3664* (2013.01)

(58) Field of Classification Search
None
See application file for complete search history.

(56) References Cited

U.S. PATENT DOCUMENTS

| | | | |
|---|---|---|---|
| 10,140,130 B2 * | 11/2018 | Wesie | G06F 21/14 |
| 10,565,090 B1 * | 2/2020 | Bowerman | G06F 21/57 |
| 2003/0233634 A1 | 12/2003 | Carrez et al. | |

(Continued)

OTHER PUBLICATIONS

H. Koo, Y. Chen, L. Lu, V. P. Kemerlis and M. Polychronakis, "Compiler-Assisted Code Randomization," 2018 IEEE Symposium on Security and Privacy (SP), San Francisco, CA, USA, 2018, pp. 461-477, doi: 10.1109/SP.2018.00029. (Year: 2018).*

(Continued)

*Primary Examiner* — Andrew M. Lyons
(74) *Attorney, Agent, or Firm* — Perkins Coie LLP

(57) ABSTRACT

A method, system, or apparatus to debug software that is reorganized in memory is presented. A post-mortem debugging session is established by loading an executable code component corresponding to a packed binary file into memory. A randomly reorganized layout of the machine code corresponding to the blocks of the original source code is generated based on a transformation defined in a function randomization library corresponding to the blocks of original source code. A core dump file corresponding to the crash event associated with the executing of the executable code component and a debug data file that includes symbol table information to debug the blocks of the original source code are received. An updated debug data file is generated that includes symbol table information corresponding to the randomly reorganized layout. A debugger program is called with the executable code component, the core dump file, and the updated debug data file.

20 Claims, 14 Drawing Sheets

(56) References Cited

U.S. PATENT DOCUMENTS

| | | | |
|---|---|---|---|
| 2013/0014275 A1* | 1/2013 | Goodes | G06F 9/44521 |
| | | | 719/331 |
| 2014/0115234 A1* | 4/2014 | Woo | G06F 12/0246 |
| | | | 711/E12.008 |
| 2015/0047049 A1* | 2/2015 | Panchenko | G06F 21/14 |
| | | | 726/26 |
| 2015/0066881 A1 | 3/2015 | Sundaram et al. | |
| 2016/0371149 A1* | 12/2016 | Antony | G06F 11/0778 |
| 2018/0046585 A1* | 2/2018 | Okhravi | G06F 12/023 |
| 2019/0114401 A1* | 4/2019 | De | G06F 21/51 |
| 2019/0227904 A1 | 7/2019 | Raviv et al. | |
| 2020/0257615 A1 | 8/2020 | Richardson et al. | |
| 2022/0179930 A1* | 6/2022 | Lotspeich | G06F 21/577 |

OTHER PUBLICATIONS

Abrath et al., "Breakpad: Diversified Binary Crash Reporting," IEEE Transactions on Dependable and Secure Computing, vol. 17, No. 4, Jul./Aug. 2020, pp. 841-856.

International Search Report and Written Opinion for International Application No. PCT/US2021/084549; dated Mar. 10, 2022; 9 pages.

* cited by examiner

```
1   void    main() {
2           int result =
3                   static_fn1() + static_fn2() + static_fn3();
4           }
5
6
7   int     static_fn1() {
8           return 123;
9           }
10
11  int     static_fn2() {
12          return 456;
13          }
14
15  int     static_fn3() {
16          return 789;
17          }
```

102 Application Code

104 Function 1

106 Function 2

108 Function 3

Source Code 100 for a program named Example.cpp

FIG 1

```
1   #include libLFR.h                                              ← 210
2
3   void    LFR_Transform (void) __attribute__ ((constructor));    ← 212
4
5   void    LFR_Transform (void) {
6           Randomize ();
7           }                                                       ← 214
8
9   void    main() {
10          int result =
11                  static_fn1() + static_fn2() + static_fn3();
12          }
13
14
15  int     static_fn1() {
16          return 123;
17          }
18
19  int     static_fn2() {
20          return 456;
21          }
22
23  int     static_fn3() {
24          return 789;
25          }
```

202 Application Code

204 Function 1

206 Function 2

208 Function 3

Source Code 200 for a program named Example2.cpp

FIG 3

```
1   $   gcc -g Example.cpp -o Example                              120
2                                                                  (Step 1)
3   $   objcopy --only-keep-debug Example Example.debug
4   $   objcopy --add-gnu-debuglink=Example.debug Example          130
5   $   strip -g Example                                           (Step 2)
6
7   $   gdb Example
8       .                                                          140
9       .                                                          (Step 3)
10      .
11 (gdb) r
12      Staring program: /home/.../Example
13 (gdb)
```

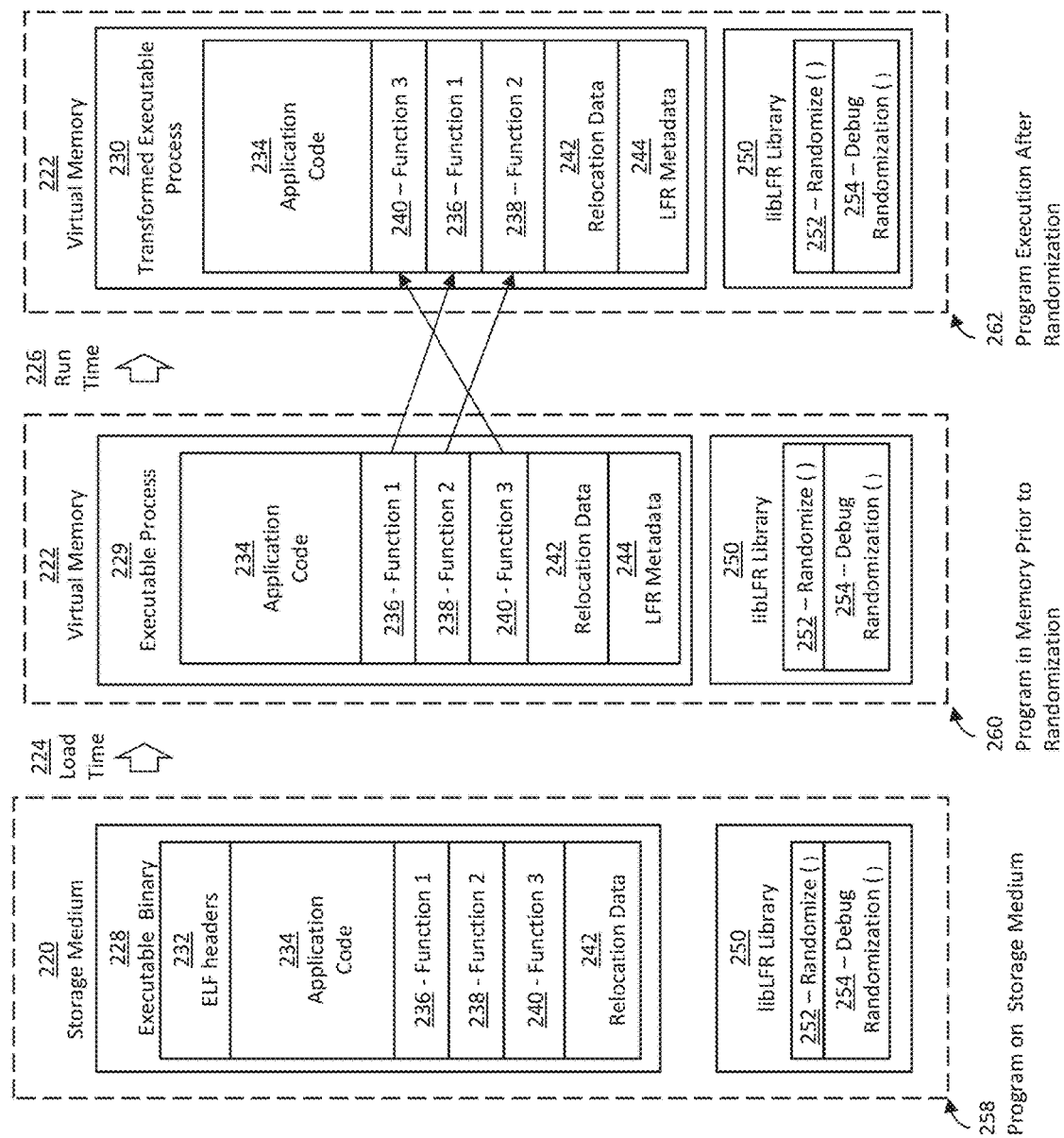

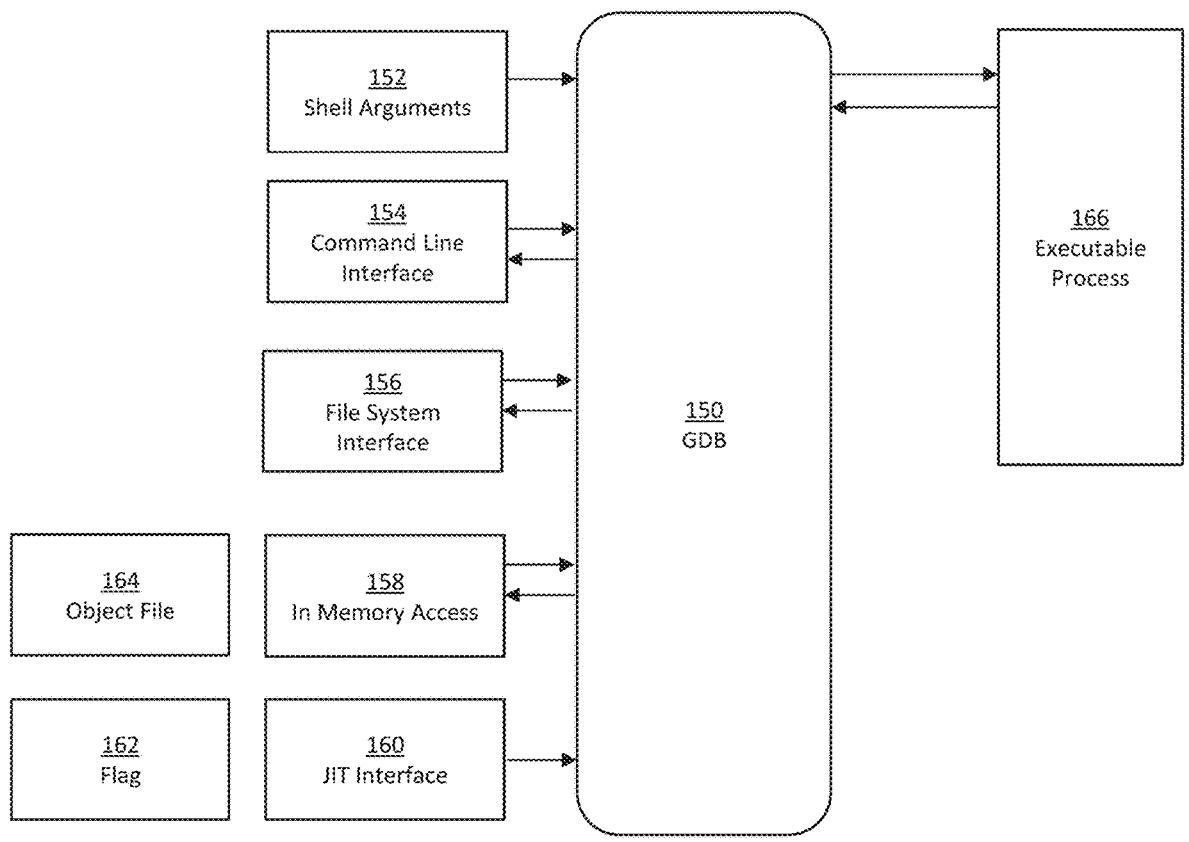

FIG 5

```
1   struct jit_code_entry                              ← 170
2   {
3     struct jit_code_entry *next_entry;
4     struct jit_code_entry *prev_entry;
5     const char *symfile_addr;
6     uint64_t symfile_size;
7   };
8                                                      ← 172
9   struct jit_descriptor
10  {
11    uint32_t version;
12    /* This type should be jit_actions_t, but we use uint32_t
13       to be explicit about the bitwidth. */
14    uint32_t action_flag;
15    struct jit_code_entry *relevant_entry;
16    struct jit_code_entry *first_entry;
17  };                                                 ← 174
18
19  /* GDB puts a breakpoint in this function. */
20  void __attribute__((noinline)) __jit_debug_register_code() { };
```

SYSTEM AND METHODS FOR POST MORTEM DEBUGGING OF TRANSFORMED BINARIES

PRIORITY

The present application claims priority to U.S. Provisional Patent Application No. 63/128,326 filed on Dec. 21, 2020, which is incorporated herein by reference in its entirety.

TECHNICAL FIELD

This disclosure is related to debugging of software improved with advanced cybersecurity solutions such as binary transformations. More particularly, the embodiments disclosed herein are directed at systems, apparatuses, and methods to facilitate debugging of software that is reorganized in memory as a result of applying a binary transformation.

BACKGROUND

Debugging is the process of analyzing a program to identify defects and issues in the program. These errors or defects are referred to as "bugs," hence the term "debugging." By identifying errors and defects, a programmer can make changes to the source code for the program, which results in development and validation of the program's source code. In most scenarios, debugging of a target program is performed using a specific type of software tool called a debugger, which allows the programmer to view the execution state and data of the program while the debugger is running. A debugger can be used to execute the target program under controlled conditions, track various operations of the target program, and monitor debug data generated in the various stages of execution of the target program. Debuggers allow users to halt the execution of the program, examine the values of variables, step through post-compiled machine code line by line, and set breakpoints on lines or specific functions that, when hit, will halt execution of the program. The compiler generates data (termed debugging data or debug data) in accordance with the memory layout of the target executable. In many scenarios, however, the target program may be preemptively subjected to a cybersecurity fortification technique to impede attackers or hackers from making undesirable changes to the source code. For example, a cybersecurity fortification technique can include application of a binary transformation to the source code resulting in random ordering or reorganization of portions of the executable in memory. Because of the reorganization, the original debugging data, which is based on an initial memory organization of the executable, does not have any meaningful linkage to the reordered executable in memory. Thus, to aid the developer for development and validation of the source code, there is a need to restructure the original debug data to reflect the reorganization caused as a result of the binary transformation.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure but are intended to be illustrative only.

FIG. 1 shows an example source code for a program without a binary transformation.

FIG. 3 shows an example of a transformed source code corresponding to the original source code in FIG. 1.

FIGS. 4A-4C show various stages of a program with respect to a binary transformation.

FIG. 5 shows a block diagram of the GNU debugger (GDB).

FIG. 6 shows the code structure of GDB variables that facilitate control of the Just-In-Time (JIT) command interface.

DETAILED DESCRIPTION

Exemplary embodiments of the present disclosure are directed to systems and methods of supporting a debugging of a transformed binary of a program. For example, in scenarios where an executable has undergone a transformation (e.g., as a cybersecurity fortification technique to impede attackers or hackers), the debugging data (created after compilation of the program) to validate and develop the program may no longer be valid. This is because the transformation can cause reorganization (in memory) of machine code corresponding to function blocks of the source code and as a result the original debugging data does not have any meaningful linkage to the reorganized function blocks. Thus, to aid the developer during development and validation, disclosed embodiments are directed at restructuring the original debugging data to reflect the reorganization of the function blocks in the software code. The present technology is directed at such scenarios. The disclosed embodiments are directed to cover at least two different types of debugging: live debugging and post-mortem debugging. By creating an in-memory object file with updated debug data or otherwise updating an original debug file, disclosed embodiments can facilitate validation and development of the program. Advantageously, the in-memory object file and/or the updated debug data file are specific types of restructured data structures designed to improve the way a computer can restore linkages between a program's debug data (useful for validation and development of the program) stored in memory subsequent to a random reorganization of the program.

Although the examples and embodiments presented herein are illustrated utilizing C and C++ programming on a Linux operating system and debugging performed by the GDB, the disclosed embodiments can apply broadly to the field of computer programming and are not limited by the programming language, application, database formats, or operating system. Furthermore, it should be understood that the term "binary file," as presented herein, encompasses executable code, object code, or library files-all of which may contain headers, blocks, or metadata used by the operating system during loading, the linker for linking purposes, and the debugger for debugging. The term "machine code" refers to the binary format (often presented in hexadecimal) stored in memory, executed by the microprocessor, and devoid of headers or metadata. The term "program" herein is used to refer to application code and associated functions that are generally unrelated to the security features described herein (word processing, data management, etc.), but it has provisions enabling use of a binary transformation. Furthermore, the terms "application code" and "application" are used interchangeably.

Figures 2A, 2B:
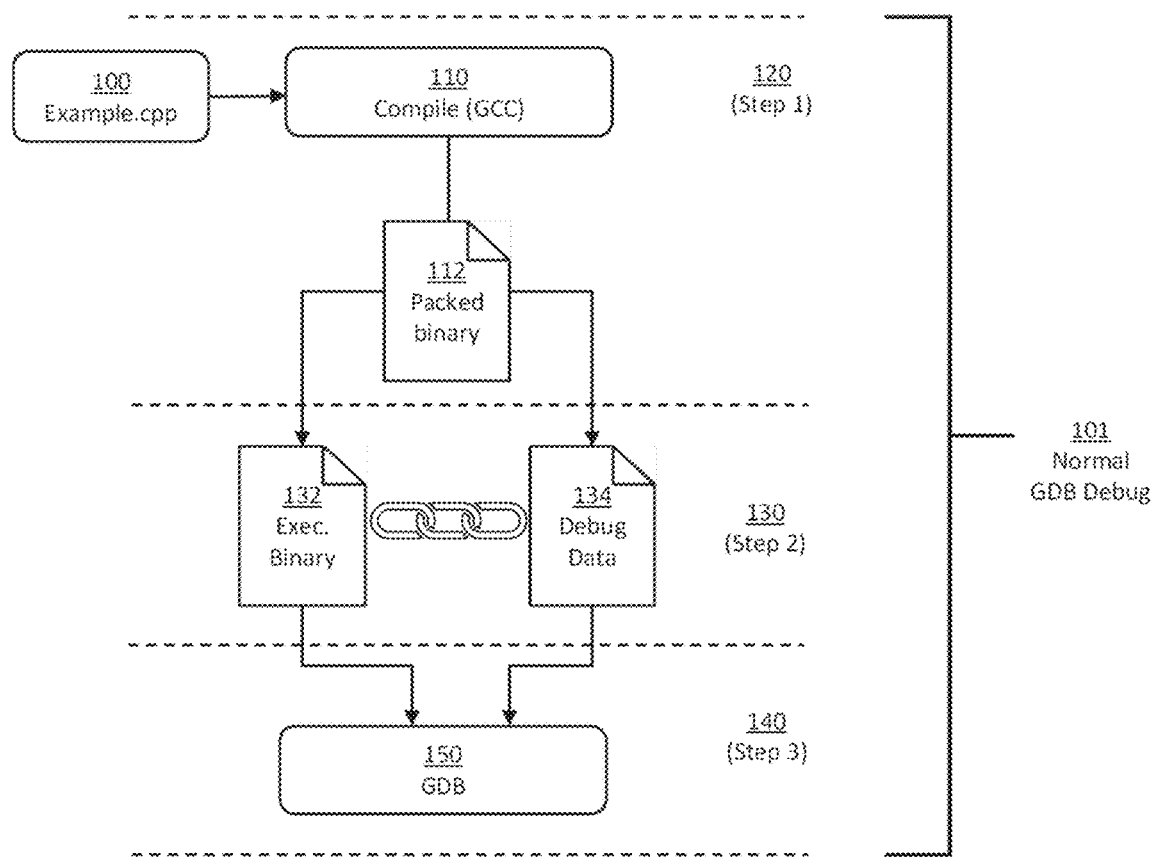
FIG. 2A shows the steps for compilation and debugging of a program without a binary transformation.
FIG. 2B shows the command line interface for compilation and debugging of a program without a binary transformation.

FIG. 1 and FIGS. 2A-2B provide a high-level overview showing interactive "live" debugging of an example program. Specifically, FIG. 1 shows a segment of a computer program 100 written using the C++ computer language. Source code 100 for a program named Example.cpp comprises the main ( ) function (denoted Application Code 102 in FIG. 1) and three functions Function 1, Function 2, Function 3 (respectively denoted 104, 106, 108). In this example, each function is designed to return a fixed integer value. The application code 102 calls each of the three functions, computes a sum based on the value retuned by each function, and subsequently places the summation into the integer variable named result. The program in its entirety (including declarations, comments, and #include preprocessor directives) comprises source code.

FIGS. 2A and 2B show high-level steps and command line instructions to compile using a C or a C++ compiler and debug Example.cpp. Specifically, high-level steps 1, 2, 3 of FIG. 2A correspond to the instructions in steps 1, 2, 3 of FIG. 2B. The debugging example in FIGS. 2A and 2B correspond to a regular debugging operation (denoted normal GDB debug 101) in which Example.cpp is compiled using the generate debugger information option "-g" (shown in line 1 of the command line interface in FIG. 2B). As an outcome of running the instructions on line 1 of FIG. 2B, the compiler generates an executable binary (a/k/a Example.exe), which is a single packed binary file 112 including both the code necessary for execution and the debugging data to debug the code. As an outcome of running the instructions on line 3 of FIG. 2B, the compiler copies the debugging data from the packed binary 112 into a separate file named debug data 134 (a/k/a Example.debug). Debug data 134 (or, debugging data 134) is a data file that includes symbolic references, variable names, and descriptive labels created in the source code 100 by a programmer to aid in development and validation of Example.cpp. As an outcome of running the instructions on line 4 of FIG. 2B, the compiler creates a link between the executable binary 132 and the debug data 134 by creating a section ".gnu_debuglink" within the executable binary 132. The link between the executable binary 132 and the debug data 134 can be used to correlate the machine code in the executable binary 132 to the symbolic references, variable names, and descriptive labels in the debug data 134. As an outcome of running the instructions on line 5 of FIG. 2B, the compiler strips or removes the majority of debug information from the executable binary 132. For example, internal symbols not required for execution of the executable binary are removed and the only debug data that remains in the executable binary 132 is the eh_frame section (e.g., which is used for run-time exception handling). At step 3 (denoted 140) of FIGS. 2A and 2B, the debugger program 150 (e.g., GDB) is launched. The debugger program 150 loads the executable binary 132 into virtual memory. Line 11 of FIG. 2B shows the GDB command "r" which begins indirect execution of the machine code residing in memory corresponding to Example.cpp.

In some embodiments, the debug data 134 created after compilation of the program is saved in a database according to a specific format such as the DWARF format. The DWARF format is a standardized format that enables high-level readability and accessibility required for efficient debugging and validation by the GDB. Thus, for example, symbol tables with definitions of variable types, line numbers, and size allocation information can be saved in a database using the DWARF format. While other debugger database formats such as stabs, COFF, and XCOFF exist, which provide similar information to the debugger, DWARF is the native format for Linux-based operating systems. Other compilers are also available, such as g++ and Clang.

FIG. 3 shows an example of a transformed source code corresponding to the original source code shown in FIG. 1. For example, FIG. 3 shows a source code 200 for a program named Example2.cpp. It will be appreciated that Example2.cpp includes a transformation applied to the original source code shown in FIG. 1. The source code shown in FIG. 3 includes a preprocessor directive portion 210, a constructor initialization portion 212, a constructor definition portion 214, application code 202, Function 1 (denoted 204), Function 2 (denoted 206), and Function 3 (denoted 208). The preprocessor directive portion 210 shows that Example2.cpp references the header file LibLFR.h. For example, the program Example2.cpp can be compiled with a link (static or dynamic) to the LFR library named Lib LFR. For example, a wrapper program can cause the linker to embed (during compilation) the header file LibLFR.h into a binary executable corresponding to Example2.cpp.

In some embodiments (such as the example shown in FIG. 3), one type of binary transformation includes the randomization operation performed on a compiled binary of Example2.cpp that results in reordering of memory locations storing machine code corresponding to Function 1, Function 2, and Function 3. In other words, each time the binary corresponding to Example2.cpp is loaded into memory, the blocks of machine code of Function 1, Function 2, and Function 3 are reordered randomly such that they move to new memory locations. Advantageously, this technique of randomizing the locations of functions in memory is a cyber security technique aimed at impeding attackers so that attackers do not have knowledge of how the binary corresponding to Example2.cpp resides in memory or which memory locations are accessible to be exploited for vulnerabilities of Example2.cpp. The randomization of a compiled binary of Example2.cpp is carried out in accordance with one or more functions residing in a separate library. In this example, the library is called Load-time Function Randomization (LFR) library (referenced in the preprocessor directive portion 210 in FIG. 3). The randomization of a compiled binary can occur immediately after the program is loaded into virtual memory and prior to performing the core intent of the program (e.g., word processing, database management, etc.). As shown on line 3, LFR_Transform ( ) 214 is a constructor placed at the entry point of the application code 202, which results in the LFR_Transform ( ) constructor getting implemented prior to execution of main ( ). As a result, the core intent of the program is unaffected. It can be seen in FIG. 3 that the transformation of the binary resulting from compilation of Example2.cpp is performed by calling the LFR_Transform ( ) constructor which calls the function named Randomize ( ). The Randomize ( ) function defined in the LFR library (also termed herein as libLFR library) performs the randomization of the compiled binary of Example2.cpp.

Similar to debugging of Example1.cpp discussed earlier, debugging of the program Example2.cpp can be performed by first compiling Example2.cpp into a packed binary and subsequently dividing the packed binary into an executable binary and a debug data file comprising debugging information. Dividing the packed binary into an executable binary and a debug data file can be equivalent to stripping the debugging information from the packed binary. The content remaining in the packed binary after stripping the debugging information is the executable binary. Although the example in FIG. 3 shows a binary transformation based on modifying the original source code Example.cpp (e.g., by adding portions 210, 212, 214), in alternate embodiments, a binary transformation may be applied without modification of the original source code and performed by a wrapper, shell script, or batch file during linking.

Generally, an operating system loads a program into virtual memory for execution in a predictable and generally sequential fashion corresponding to its organization on the hard drive. It is this predictability of how the program will be loaded that creates a cybersecurity vulnerability that may be exploited by an attacker. A countermeasure known as a binary transformation may be implemented to thwart the attacker. Original source code which has been subjected to a binary transformation can include functions that are randomly reorganized within virtual memory prior to execution of the program. One goal of this type of binary transformation is to randomly relocate the functions of the program residing in virtual memory such that the program performs normal operation without any noticeable or negative effects, while reducing any security exploits that may be previously known by an attacker.

FIGS. 4A, 4B, and 4C show various stages of the program with respect to a binary transformation. In the example depicted in FIGS. 4A, 4B, and 4C, the executable corresponds to Example2.cpp discussed in FIG. 3. Specifically, FIG. 4A shows a first stage 258 when the program resides on a storage medium (e.g., hard drive, network, cloud storage, flash drive, etc.), FIG. 4B shows a second stage 260 when the program resides in virtual memory (or, simply memory), and FIG. 4C shows a third stage 262 when the program begins execution in memory after randomization of the program. There are two distinct events that occur as a program moves from a storage medium into virtual memory and the point at which the computer begins executing the program due to the binary transformation. The first event is shown as Load-Time 224 where the program is taken from the storage medium 220 and loaded into virtual memory 222, for example, by a loader. The second event, Run-Time 226, takes place after the program and associated libraries are loaded into memory and during execution of the program. FIG. 4A shows the organization of a storage medium 220 where a program is stored as a file. The program has been pre-configured to support a binary transformation. The program includes executable binary 228 and libLFR library 250. The executable binary 228 includes Executable and Linkable Format (ELF) headers 232, application code 234, Function 1, Function 2, Function 3 (respectively denoted 236, 238, 240) arranged in a sequential order, and relocation data 242. The libLFR library 250 includes a randomize function 252 (a/k/a "Randomize ( )") and the debug randomization function 254 (a/k/a "Debug Randomization ( )"). The ELF headers 232 in executable binary 228 provide (among other things) information used by the operating system during loading to allocate memory, identify library dependencies, and identify functions (functional blocks) within the executable binary 228. In embodiments where a binary is subjected to a transformation, the relocation data 242 in the executable binary 228 is data describing a static arrangement of the blocks of source code (e.g., arrangement of Function 1, Function 2, Function 3) and requirements of the blocks of the original source code (e.g., memory requirements of Function 1, Function 2, Function 3) when the blocks are loaded into virtual memory. For example, relocation data 242 can provide information about the program structure, function memory requirements, and other layout information for use during transformation/randomization. The relocation data 242 can be created by the linker at an earlier stage of program development as part of building the executable binary (i.e., compiling and linking). Also residing on the storage medium 220 is the libLFR library 250 which includes the randomize function 252 for randomly reorganizing the memory layout of the functions and subsequently updating the executable process in memory to utilize the randomly reorganized memory layout of the functions by the application code. The libLFR library 250 also includes the debug randomization function 254, which will be used during a debugging session to dynamically remap the symbol tables residing in the original debug data file to match the relocated functions after transformation. The libLFR library 250 may be statically linked or dynamically linked to the program.

At a load-time event 224, the information from the ELF headers 232 is used (e.g., by a loader) to allocate space in virtual memory 222 for the executable process 229, in-process memory including LFR metadata 244, and the libLFR library 250. Within the LFR metadata 244, the loader creates and stores linkage mappings such that the code blocks and functions are accessible. The LFR metadata 244 is uniquely related to the memory locations where portions of the machine code corresponding to Function 1, Function 2, Function 3 reside. Further, the LFR metadata 244 includes the memory address for a seed for generating a random reorganization of functions and code blocks in memory. The value for the seed will be retrieved from the Kernel random number generator during transformation. The seed used for randomization is such that if the same seed (a/k/a seed value) is used twice for the generating a random reorganization of functions and code blocks in memory, the outcome of the randomization will be largely identical. Generally, it is desirable outside the scope of debugging a program that the seed of the random number generator be changed every time the program (e.g., the executable code component) is executed.

As shown following the load-time event 224, the application code 234 and three functions 236, 238, 240 are loaded into virtual memory 222 and remain in sequential order. The application code 234, which will call the functions (e.g., Function 1, Function 2, Function 3), is linked to the locations of the functions as stored in virtual memory at load-time. Thus, debugger data which may have been created earlier during the build operation (e.g., including compile and link operations) would correlate to the memory locations and functional addresses as stored in virtual memory at load-time, thus allowing a developer to effectively utilize the debugger.

At run-time event 226 (defined as an event during execution of the program), the executable process 229 is subjected to a transformation (e.g., a random modification or a randomization event) resulting in a transformed executable process 230 (or, equivalently termed as a transformed binary). For example, at a run-time event 226, the executable process 229 calls the randomize function 252 of the libLFR Library 250. Utilizing the relocation data 242 and the LFR metadata 244, the randomize function 252 generates a randomly reorganized memory layout of machine code corresponding to Function 1, Function 2, Function 3 of the transformed executable process 230. For example, the randomize function can include one or more algorithms that use a randomization seed to generate a random (or, pseudorandom) reorganization of functions and code blocks in memory and subsequently determine addresses of memory locations corresponding to the randomly reorganized memory layout. For example, if machine code corresponding to Function 1, Function 2, Function 3 of executable process 229 is located at a first set of memory locations, following the randomization event, the machine code corresponding to Function 1, Function 2, Function 3 of transformed executable process 230 includes a randomly reorganized memory layout of the machine code located within a second set of memory locations. After the transformation or randomization event, the randomize function 252 also updates the LFR metadata 244 to correspond to the randomly reorganized layout. As a result, calls to Function 1, Function 2, Function 3 are properly reconnected following the randomization event.

The transformed executable process 230 is identical in functionality to the executable process 229 created at Load-time 224; however, the physical addresses of the Function 1, Function 2, Function 3 have been muddled or obfuscated (indicated by the arrows between blocks 260 and 262). Thus, any prior knowledge of the program structure is no longer valid. While this result is highly beneficial to impede cyber-attacks, this transformation or randomization of the function blocks renders debug data obsolete. The debug data (optionally created during program compilation) is useful for program validation/development. To support debugging efforts of a transformed binary, the debug data is subjected to undergo a similar transformation every time the executable (binary) process is transformed. Embodiments of the present technology are directed at applying a similar transformation to a debug data so that the original debug data created during compilation is subjected to a transformation resulting in updated debug data. As a result of applying the methods disclosed herein, descriptive symbols, labels, and variable names included in the original debug data are updated in accordance with a transformation that is similar to the transformation applied on the executable.

FIG. 5 shows a block diagram of a debugger program (such as GDB 150). Upon invoking GDB 150, arguments may be passed to GDB 150 through the shell interface 152. The arguments sent to GDB 150 can include debug data embedded in the executable process 166 or as a separate file. Examples of arguments can include a name of an executable process 166 to load, a name of a debug file, or a name of a core dump file arising due to a segmentation fault or crash. The core dump includes information relating to program segments, the stack, the heap, and other data. In the case where a process 166 loaded for debug using arguments passed through the shell interface 152, the process will be loaded into virtual memory. GDB 150 may connect, control, and inspect the status of the process 166 by executing a series of ptrace system calls via the kernel of the operating system. While executing process 166, a command line interface 154 allows the user to enter instructions, set break points, run, and execute other debug related functions. Alternatively, the user can enter instructions via a browser or a front-end graphical user interface (GUI) of GDB 150. GDB 150 has direct access to the file system via the file system interface 156 for certain events, such as reading a linked debug data file (e.g., ending with a .debug extension) during loading the process 166. GDB 150 may search the file system for the specified file. In some embodiments, the disclosed technology creates one or more in-memory object files 164 having updated symbol table information corresponding to a randomly reorganized layout of functional blocks in memory, for example, subsequent to the program getting subjected to a transformation. For example, the one or more in-memory object files 164 can be based on the original debug data file, a randomization seed value, and/or relocation data about the arrangement of functions in the original source code. In those embodiments, the in-memory object files 164 are read using the in-memory access 158 and sent to GDB 150 through the Just-In-Time (JIT) compilation interface. For example, the JIT interface of the GDB 150 is instructed to point to the path of in-memory object files 164, and the reading is initiated by setting a flag 162 associated with a specific memory location of the JIT interface of the GDB 150. The JIT interface 160 allows either a remote program or the program being debugged to register the object file 164 with the debugger 150 at runtime. Regardless of how the object file 164 is created (e.g., either a live debug method or a post-mortem debug method), the steps for registration of the object file 164 through the JIT interface 160 are the same. After the object file 164 is brought into GDB 150 with the symbol information corresponding to the post-randomization arrangement of function blocks, the debug operation of the transformed executable is identical to a standard or non-transformed executable.

In some implementations, GDB 150 can be the GNU debugger, commonly referred to as GDB, widely used for C and C++ software development (as well as other languages) and across operating systems including UNIX, Linux, Windows, and Mac OS X operations systems. The GDB 150 is typically launched with parameters identifying a target executable file, which is then loaded as a process into virtual memory. The process residing in memory is composed of machine code and contains no symbols (such as variable or function names) or other information to aid the programmer in debugging. The GNU debugger can execute and manipulate the process through a series of indirect systems calls through the kernel. To bridge the practically unreadable machine code to the decipherable content, the debugger relies on the debug data (e.g., loaded as a debug data file specified by a link in the executable program or, in the case of a transformed binary, read through the JIT interface from the in-memory object file 164 in FIG. 5).

FIG. 6 shows the JIT interface variable structure in GDB for variables which are written to initiate the JIT interface to read the object file. As shown in the code, two structures (a/k/a struct) are named jit_code_entry 170 and jit_descriptor 172, and the function is named jit_debug_register_code 174. The information regarding the location and size of the in-memory object file is loaded into members of the jit_code_entry structure—and more specifically the pointer to the file location and size of the object file are written into symfile_addr and symfile_size respectively. Next, the member of the jit_descriptor structure named the action_flag is set to a known value (e.g., the enumerated value assigned to constant "JIT_register") to initiate the read of the object file. Finally, a call is made to the function jit_debug_register_code which triggers the event so that the object file is registered. The process of registering the in-memory object file through the JIT interface is incrementally additive—meaning that both the original debug data (prior to a randomization) and the updated debug data (as a consequence of the randomization) will appear at different memory locations. Because presence of both original debug data and the updated debug data can cause confusion, in some implementations, a portion of the original debug data is deliberately renamed so that it is ignored by the debugger. For example, the .gnu_debuglink section of the ELF header in the object file is renamed as a different section name so that it is ignored by the debugger.

Figure 7A:
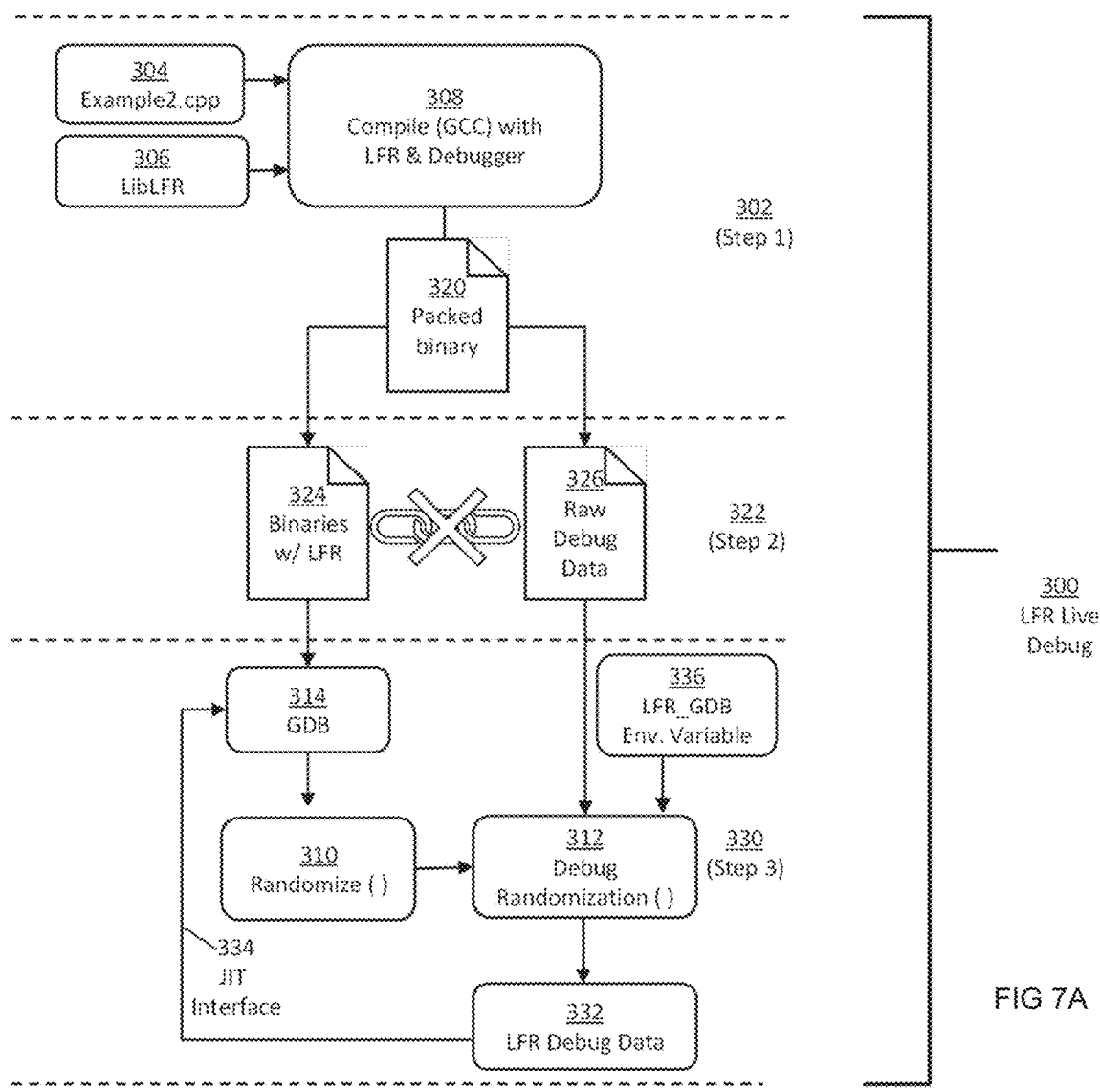
FIG. 7A shows the steps for compilation and debugging of a transformed binary, in accordance with an embodiment of the present disclosure.
Figure 7B:
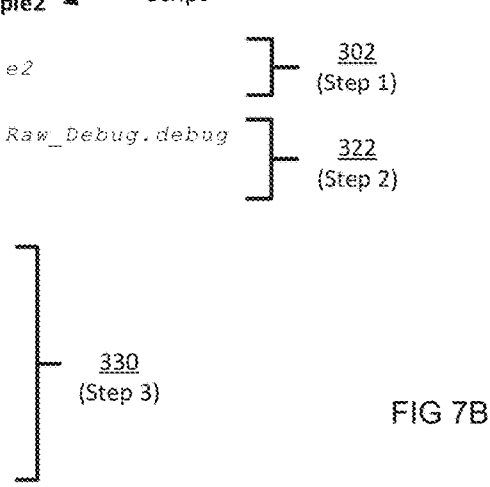
FIG. 7B shows the command line interface for compilation and debugging of a transformed binary, in accordance with an embodiment of the present disclosure.

FIGS. 7A and 7B show high-level steps and scripts to compile and debug a program that is subjected to a transformation such as Load-time Function Randomization (LFR). Specifically, FIGS. 7A and 7B pertain to a live or interactive debugging session in which a program is loaded into a debugger's GUI. Next, while the program is being run under controlled conditions, the program is analyzed by stepping through the program's machine code or source code, setting break points, examining program data, and determining how the program is running. The source code of the program Example2.cpp (denoted 304) includes calls to one or more functions in LFR library 306 (named LibLFR). For example, Example2.cpp can include calls to randomize function 310 (a/k/a "Randomize ( )") and debug randomize function 312 (a/k/a "Debug_Randomize ( )") residing in LibLFR. In FIG. 7A, Example2.cpp and LibLFR are both shown as inputs to the GCC compiler 308. Compiler options (such as "-g" option and/or "-gdwarf-2" option) are passed as arguments to produce debugger information. It will be understood that the debugger information produced initially corresponds to the original debugging information prior to the transformation of the binary corresponding to Example2.cpp. At the output of step 1, the packed binary 320 is produced which includes the machine code corresponding to function blocks in Example2.cpp that are associated with LibLFR and relocation data describing a static arrangement of the function blocks in Example2.cpp along with their respective memory requirements. The packed binary 320 also includes symbol table information to debug the blocks of the original source code.

In step 2, the packed binary 320 is separated or divided into an executable code component (named binaries with LFR 324) and a debug data component (named raw debug data 326). Dividing the packed binary 320 into an executable code component and a debug data component can be equivalent to stripping the debugging information from the packed binary. The content remaining in the packed binary after stripping the debugging information is the executable binary. The executable code component can be the machine code corresponding to function blocks in Example2.cpp that are associated with LibLFR and relocation data describing a static arrangement of the function blocks in Example2.cpp along with their respective memory requirements. The debug data component (e.g., an object file) can include symbol table information to debug the blocks of the original source code. In some implementations, the executable code component can be processed further. For example, a .debug section information from the ELF header section of the executable code can be removed. As a result, the debug data component is removed from the executable code component. If the linkage between the executable code component and the debug data component is not removed, then a debugger (such as GDB 314) would load the debug data component which would lack the updated symbols necessary to debug Example2.cpp.

In step 3, the GDB 314 is invoked along with the file containing the executable file component as a command line argument, resulting in the debugger and the executable code component being loaded into memory. Upon loading the executable code component into memory, a section of writable memory, herein referred to as LFR metadata, is created. The LFR metadata describes memory addresses where portions of the machine code corresponding to function blocks in Example2.cpp reside in memory. Following the binary transformation by the randomize function 310 the LFR metadata created can include a randomization seed value. The LFR metadata created is unique to the memory locations in which portions of the machine code corresponding to function blocks in Example2.cpp reside.

The GDB debugger is capable of remotely executing the executable code component under control (e.g., based on system calls to the kernel of the operating system) of the GDB 314. Upon execution, the executable code component calls the randomize function 310 residing in the libLFR 306. The randomize function 310 performs the Load-time Function Randomization of the function blocks in Example2.cpp. As a result, memory locations where portions of the machine code correspond to Example2.cpp are reorganized randomly in memory. The randomly reorganized memory layout is based on subjecting the executable code component to a transformation defined in libLFR 306. Furthermore, the LFR metadata is updated to correspond to the randomly reorganized memory layout. For example, the memory addresses (where the portions of the machine code corresponding to function blocks in Example2.cpp were initially stored) in LFR metadata are updated to point to the randomly reorganized memory layout. In some embodiments, updating the LFR metadata involves a use of the relocation data generated in step 1. Because the information in the debug data component still points to the initial memory addresses (and not the updated memory addresses) of the portions of the machine code corresponding to function blocks in Example2.cpp, the information in the debug data component also needs to be updated to correspond to the randomly reordered layout of the transformed binary. Accordingly, in some implementations, debug randomization function 312 (a/k/a "Debug_Randomization( )") residing in libLFR 306 is called immediately following and in response to the completion of the randomize function 310. Debug randomization 312 creates an in-memory object file (named LFR debug data 332) containing updated references associated with the new layout using (a) the symbol table information in the debug data component in step 2, (b) the relocation data in step 1, and/or (c) the randomization seed value created in step 3. The debug randomization function 312 can also format contents of the in-memory object file according to a specific format (e.g., DWARF format) of a database that stores the in-memory object file. Thus, the in-memory object file can be regarded as a transformed version of the debug data component as it includes updated symbol table information corresponding to the randomly reorganized layout of the portions of the machine code. In FIG. 7A, the in-memory object file includes symbol table information corresponding to the transformed Example2.cpp. During step 3, the in-memory symbol table is provided to the GDB 314 via the JIT interface 334. In response, GDB 314 attaches to the in-memory object file and uses the in-memory object file to facilitate validation and debugging. In some embodiments, GDB may unregister the original debug data component (e.g., raw debug data 326) to free up memory. In some embodiments, creation of the in-memory object file is optional.

In some embodiments, a user who desires debugging and validation using the updated debugger information can set an environmental variable (e.g., LFR_GDB environmental variable 336) to indicate his/her interest in debugging and validation of the source code, and the in-memory object file will be created and sent to the GDB 314 via the JIT interface 334. Alternatively, if the environmental variable is disabled, then the in-memory object file is prevented from being created. As a result, the transformed Example2.cpp with the randomly reordered layout is generated but an in-memory object file with updated debugging information is not generated. In the case where the in-memory object file is not generated, a user may proceed with a debugger session based on machine code only. In some embodiments, the in-memory object file is re-formatted to meet debugger format specifications. For example, the contents of the in-memory object file is re-formatted according to DWARF database format.

FIG. 7B provides additional details corresponding to the steps shown in FIG. 7A. To aid the developer, in some embodiments, a script is provided called "lfr-helper.sh" 350 which invokes step 1 and step 2 of steps described in FIG. 7A. As shown in FIG. 7B, several parameters are passed to the script "lfr-helper.sh" 350, such as the compiler information, the option to create and specify the format of the debug data component, the name of the program, and the option for creation and naming the packed binary file. These parameters can be passed to the script to support the automation of step 1 and step 2 in FIG. 7B. Additionally, in some embodiments, the script 350 further aids the developer by intercepting calls to the compiler and appending the LFR relocation data.

As shown in step 1 of FIG. 7B, the debugger option "-gdwarf-2" specifies the format of the debug data to support DWARF version 2. In some embodiments, the format may be unspecified at the command line and later detected by the debug randomization function 312 to accommodate standardized or proprietary formats of the debug data.

Step 2 in FIG. 7B shows two instructions. The first instruction (line 5) extracts the debug data from the packed binary file and places the debug data into a specified file name (e.g., named "Raw_Debug.debug"). The actual filename containing the original debug symbols (e.g., raw debug data 326) may be reported to the libLFR through a number of methods such as using environment variables, sharing through scripted language, passing through a filesystem, or embedding within a section of the executable binary. The second instruction (line 6) removes the debug data from the packed binary, thus reducing the file size of the executable code component.

Step 3 of FIG. 7B shows the environmental variable, LFR_GDB, being set, thereby enabling the updating of LFR Debug Data following the randomization and subsequent passing of the in-memory object file via the JIT interface. Lines 9 through 11 show the invocation of the debugger and memory loading the executable code component of Example2.cpp. Line 12 shows the command 'r' to run or execute the executable code component.

Figure 8:
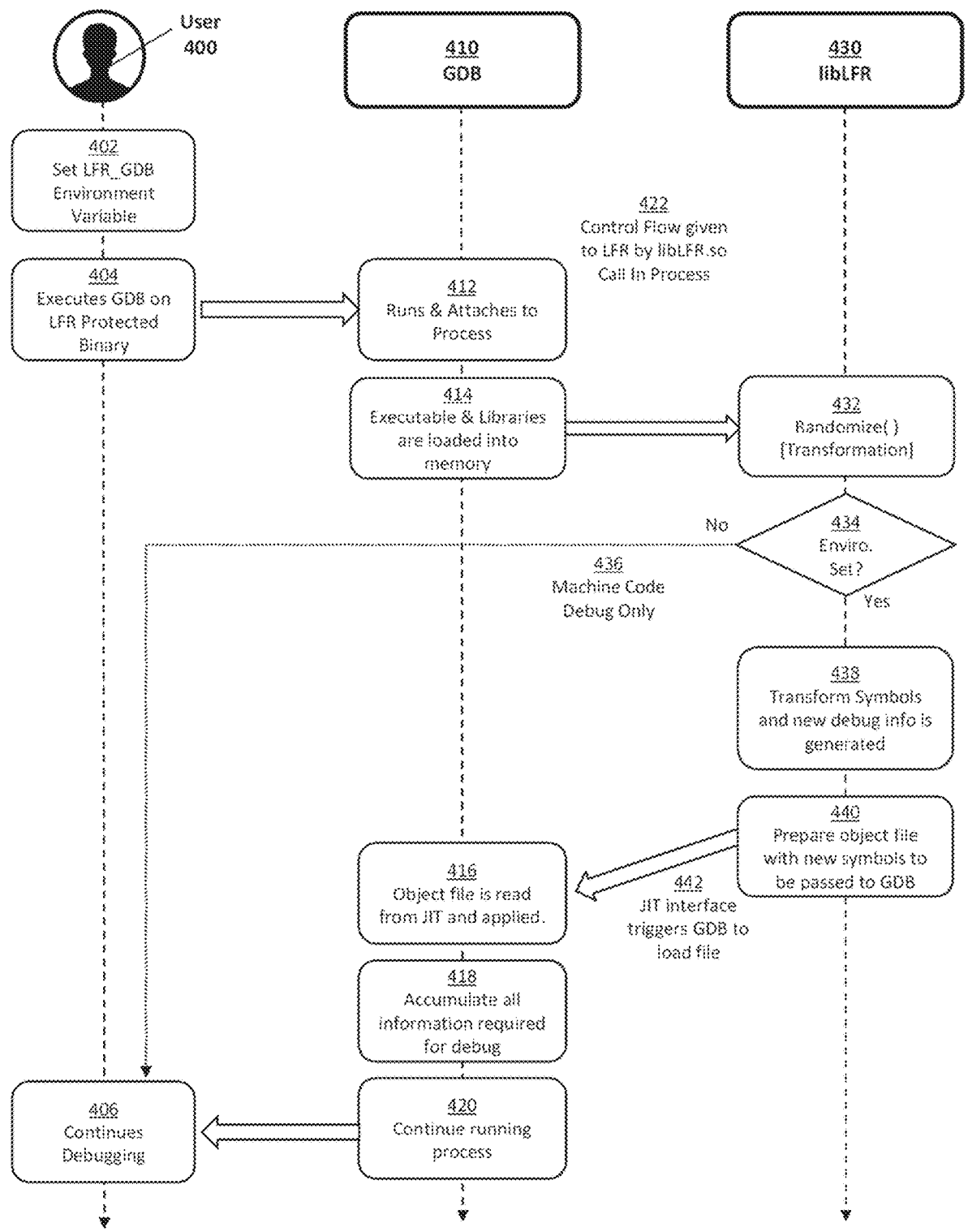
FIG. 8 shows a system communication diagram for live debugging of a transformed binary, in accordance with an embodiment of the present disclosure.

FIG. 8 shows a system communication diagram for live debugging of a transformed binary. The system communication diagram shown in FIG. 8 is from the perspective of the user 400, the GDB debugger 410, and the randomization library named libLFR library 430. Initially, the user 400 sets (step 402) the LFR_GDB environment variable 402 to enable the creation of the in-memory object file or otherwise generate updated debugging information following the randomization event generated by one or more functions in libLFR 430. The user begins (step 404) the GDB debugger session with the transformed binary 404 (a/k/a LFR protected binary). The GDB debugger 410 attaches (step 412) to the executable (including the transformed binary and one or more libraries). Once the executable binary is 'run' or executed under the control of GDB 410, the control flow is passed to libLFR 430 to perform (step 432) the binary transformation via the call to the Randomize ( ) function. After the randomization of the function blocks in the executable, the environment variable is checked (step 434) to determine if there was a selection for updated debugging information. If the environment variable LFR_GDB is not set (or, clear) meaning there is no requirement for updated debugging information, the control flow passes (step 436) to the user to perform a machine code debug session 436.

In the case where the user has requested updated debug information by setting the environment variable, libLFR creates (step 438) an in-memory object file with symbols corresponding to the new structure (e.g., the randomly reorganized memory layout) of the transformed binary. The symbols corresponding to the new structure can include one or more symbols related to the transformation performed on the binary. In order to bring the updated debug information into the debugger via the in-memory object file, the libLFR 430 performs the steps required to activate the JIT interface. These steps include modifying the known memory address of the GDB with information regarding the size and location of the newly created in-memory object file, setting the action flag, and making a call to register the in-memory object file through the JIT interface of the GDB debugger 410.

The call to register the new object file (a/k/a the in-memory object file) triggers (step 442) GDB to load the file through the JIT interface. The contents of the new object file are read, and the symbols corresponding to the new structure mapping are applied (step 416) to the executable under the debugger's control. GDB accumulates (step 418) information for debugging and continues running (step 420) the executable process until the end of the program, a breakpoint, or other event that transfers control back to the user 406.

Figure 9:
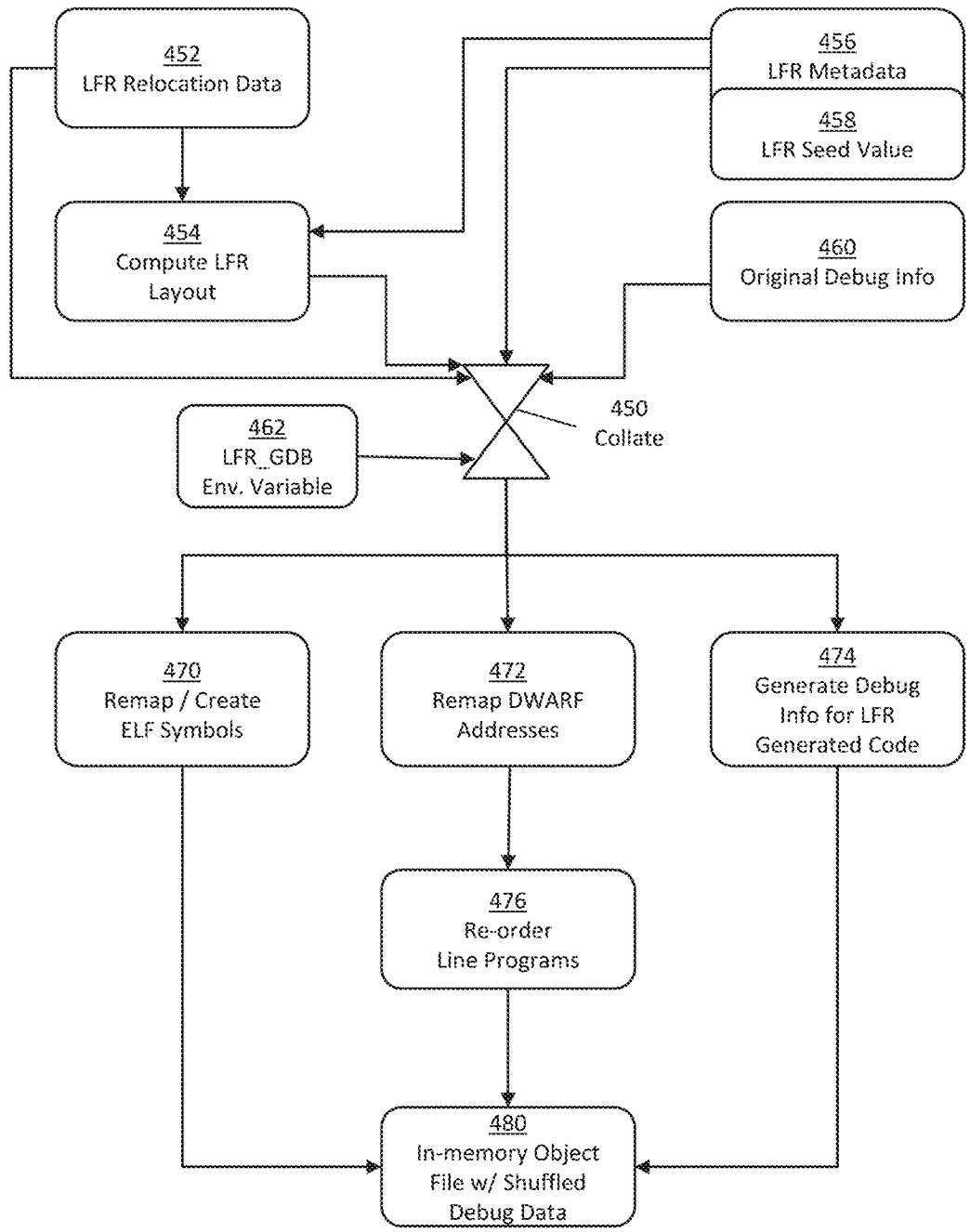
FIG. 9 shows a block diagram for live debugging of a transformed binary, in accordance with an embodiment of the present disclosure.

FIG. 9 shows a block diagram for live debugging of a transformed binary. For example, the steps shown in FIG. 9 can be implemented by a Debug_Randomization ( ) routine residing in the LFR library. Inputs to the collate process 450 include the relocation data (e.g., LFR relocation data 452), LFR metadata (e.g., LFR metadata 456), and the debug data component (e.g., original debug info 460 which is the original, non-randomized debug file created after compilation of the program). LFR metadata (alternately termed herein as process-specific metadata) includes a seed value (e.g., LFR seed value 458). The debug data component can include symbol table information such as descriptive symbols, labels, and variable names created by the programmer in a human-readable format. The relocation data and the LFR metadata (including the seed value) are used in computing a randomly reorganized memory layout of portions of the machine code corresponding to function blocks of the source code. Computing the randomly reorganized memory layout can be regarded as computing or deriving the memory locations of the function blocks and the variables in the function blocks. For example, if the portions of the machine code corresponding to the blocks of the original source code are initially stored at a first set of memory locations, subsequent to generation of the reorganized memory layout, the LFR metadata is updated to correspond to a second set of memory locations associated with the randomly reorganized memory layout. In some implementations, an algorithm included in the Randomize ( ) function of the LFR library takes the seed value, the relocation data, and the LFR metadata to compute the reorganized memory layout.

The relocation data created during compilation describes a static arrangement of the blocks of source code and memory requirements of the blocks of the original source code. For example, the relocation data includes information describing a static arrangement of the blocks of source code and memory requirements of the blocks of the original source code. The LFR metadata is created in memory during load time. The LFR metadata is unique to the memory location of the executable process after being loaded into memory and is thereby process-specific metadata. In other words, if the executable process is loaded into a different memory location, the LFR metadata will change as well. The LFR metadata includes a randomization seed value 458 used for generation of a randomly reorganized memory layout of machine code corresponding to function blocks of the original source code. The LFR metadata describes memory addresses where portions of the machine code corresponding to the blocks of the original source code reside in memory. Prior to randomization, the LFR metadata uniquely corresponds to a first set of memory locations where the portions of the machine code reside. The randomization seed value is a seed for generating a deterministic randomization of the machine code corresponding to function blocks of the original source code. That is, the randomly reorganized memory layout of machine code generated using the pseudorandom sequence of numbers is repeatable over time, if the same seed value is used in each repetition. However, if the seed value is changed, the randomly reorganized memory layout of the machine code changes.

Further, the debug data component can be in a specified debugger format, such as DWARF. FIG. 9 also shows LFR_GDB environmental variable 462 can be used to enable/disable a selection for updated debugging information. For example, enabling the selection for the updated debugging information results in the creation of in-memory object file 480. Otherwise, if the LFR_GDB environmental variable 462 is disabled, then the in-memory object file is not created after transformation of a binary. The in-memory object file 480 is created using the debug data component, the randomization seed value, the relocation data, and/or one or more randomization algorithms. For example, the one or more randomization algorithms can be similar, consistent, or almost identical to an algorithm included in the Randomize ( ) function of the LFR library.

The output of the collate process that finally results in generation of the in-memory object file can further include additional processing stages using the debug data component and the randomly reorganized memory layout. For example, the first block 470 of output includes modifications to the ELF headers in the debug data component. The modifications are made to ensure that function blocks referenced in the ELF headers are properly matched to the memory locations of the function blocks in the randomly reorganized memory layout. The second block 472 updates symbol tables used in the DWARF section of the debug data component to point to the memory locations of the function blocks in the randomly reorganized memory layout. The third block 474 includes re-listing various details (such as the structure of variables or function type) in the debug data component.

In some embodiments, DWARF version 2 is used as the format for the debug data component. One descriptive entity in DWARF is the Debugging Information Entry (DIE). The DIE has a tag and a list of attributes which further describes the entity. Each DIE is either a child, or sibling, of a single parent entry (the compilation unit), thus essentially creating a treelike data structure. To minimize the size of the data saved in the in-memory object file (e.g., object file 480 in FIG. 9), DWARF specifications state that one or more tree data structures in a debug data file are to be organized in prefix order (i.e., having ordered properties of reflexivity, transitivity, antisymmetric, and downward totality). Thus, the tree data structures in the debug data component are reordered (step 476) to meet DWARF specifications. As a final outcome, the in-memory object file is created (step 480). In some embodiments, the in-memory object file is essentially based on shuffling information in the debug data component (i.e., the original debugging information generated after compilation and prior to the randomization event). The shuffling of the information utilizes information of the memory locations of the function blocks in the randomly reorganized memory layout. The in-memory object file includes debug data corresponding to the post-randomized LFR binary (alternately, the transformed binary). In a live or interactive debugging session, the object file is created following the randomization event, resides as an in-memory file, and is loaded into the GDB debugger via the JIT interface.

Figure 10:
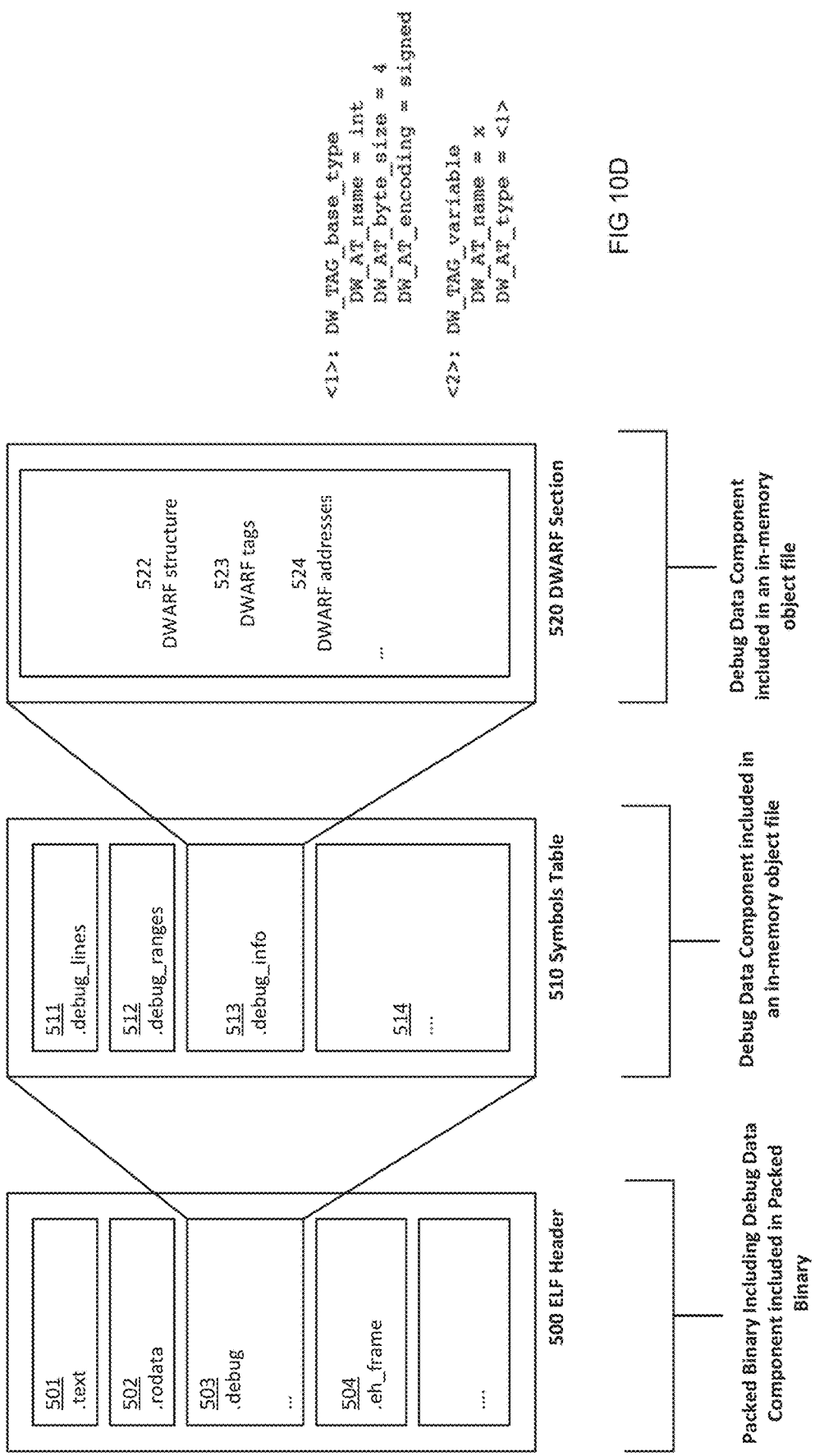
FIGS. 10A-10D show examples of information included in debug data, in accordance with an embodiment of the present disclosure.

FIGS. 10A-10D show examples of information included in debug data (or, alternatively termed herein as debug data component). Specifically, FIG. 10A shows a debug data component included as part of a packed binary file. FIGS. 10B-10C show a debug data component included in an in-memory object file. The in-memory object file includes information from the debug data component in the packed binary. The examples in FIGS. 10B-10C are intended to illustrate the nesting of the data and not necessarily the specific ordering of the nested information. In most operating systems, including Linux, object files (such as the debug data component and the in-memory object file) include a header structured according to an ELF format. During a binary transformation, it is likely that there will be changes in the line numbers of functional blocks, their respective range lists, and the addresses of variables in the functional blocks because functional blocks may get reorganized over non-contiguous memory addresses. However, because the sizes of variables and type definitions of variables are predefined, the sizes of variables and their types do not change during a binary transformation. For example, a variable which is a sixteen-bit unsigned integer before transformation will remain a sixteen-bit unsigned integer after the binary transformation. Thus, if the debug data component in the original source code included a label, the memory address (in the in-memory object file) corresponding to the label is updated as a result of the transformation. The label in the original source can be used to identify a processor entry point to the corresponding machine code portion. Alternately, the label in the original source can be used to identify a variable having a predefined size and a predefined type. While the contents of the debug data component are DWARF-formatted, as memory addresses are updated because of the transformation, the in-memory object file needs to be re-formatted to adhere to the DWARF specification.

As shown in FIG. 10A, the ELF header 500 of the packed binary includes a .text section 501, a .rodata section 502, a .debug section 503, an .eh_frame section 504, and other debugging data. Information in the .debug section 503 (alternatively termed as Line Program) generally constitutes human-decipherable descriptive text. In some embodiments, the information included in the .debug section 503 is sorted in an ascending/descending sequence. As a result, the data in the .debug section 503 is organized as a contiguous region.

FIG. 10B shows that the .debug section 503 of the packed binary is part of symbol table 510 included in an in-memory object file. Symbol table 510 includes .debug_line 511, .debug_ranges 512, and .debug_info 513. The .debug_info section 513 constitutes DWARF section 520 for each DIE in the in-memory object file. DIE entries typically have a nested format.

To illustrate the nested nature of a DIE, FIG. 10D shows an example of the debugger entry for the source code line "int x". The first entry defines a first DIE tag <1> as an integer variable denoted "x," having a size of 4 bytes, and the variable belonging to a signed integer type. The second DIE tag <2> defines a variable having the name "x" and of the type defined by the first tag <1>. It will be appreciated that the in-memory object file includes one or more DIE tags.

In some embodiments, the present technology is directed at live or interactive debugging sessions. During a live debugging session, the program that is to be debugged for errors/defects is analyzed by allowing the program to run under controlled conditions, stepping through the program's machine code or source code, setting break points, examining program data, and looking at how the program is running in real time.

In some embodiments, the present technology is directed at post-mortem debugging session. A post-mortem debugging session is a type of debugging in which information about how the program is running is collected as the program is running; however, such information is not available for access to the programmer until the program crashes. Thus, a post-mortem debugging session can be used to determine the cause of a program crash. Most crashes are the result of executing invalid machine instructions, incurring an exception such as a segmentation fault, or a floating-point error. Typical causes include incorrect address values in the program counter, buffer overflow, overwriting a portion of the affected program code due to an earlier bug, read access violation, accessing invalid memory addresses, using an illegal opcode, or triggering an unhandled exception. Even minor mistakes during code development, such as dividing by zero or passing an invalid pointer, can cause a process to crash. The original software bug that started this chain of events is typically considered to be the cause of the crash. A crash results in the program ceasing to function properly and exiting. When a program crashes, in most cases no error message is displayed. Even if an error message is displayed, the message can be short, cryptic and not provide meaningful information about the cause of the crash. In many scenarios, the program is preemptively subjected to a cybersecurity fortification technique to impede attackers or hackers from making undesirable changes to the source code. For example, a cybersecurity fortification technique can include application of a binary transformation to the source code resulting in random ordering of portions of the application software in memory.

In some embodiments, the present technology is directed at facilitating a debugging session so that the cause of the crash can be determined when the source code is subjected to a transformation (a/k/a a randomization event generated by one or more function residing within a function randomization library). Such a type of debugging session occurring after a system crash is called as a post-mortem debugging session. To recreate the conditions which caused an executable process to crash, embodiments disclosed herein are generating an exact image of the memory contents at the time the exception/crash occurred. This image of the memory, typically referred to as a core dump (and saved into a core dump file), is created after the exception/crash has occurred. The core dump includes information relating to program segments, the stack, the heap, the in-process memory, one or more threads, variable values collected at the time of the crash, and other data.

In cases of live debugging, generation of the debug object file immediately follows the randomization event. However, in case of post-mortem debugging, generation of the debug object file typically occurs much later than the randomization event. Further, in a post-mortem debugging session, the randomization seed is stored in the dump file, whereas in live debugging, the randomization seed is stored in memory.

Figure 11:
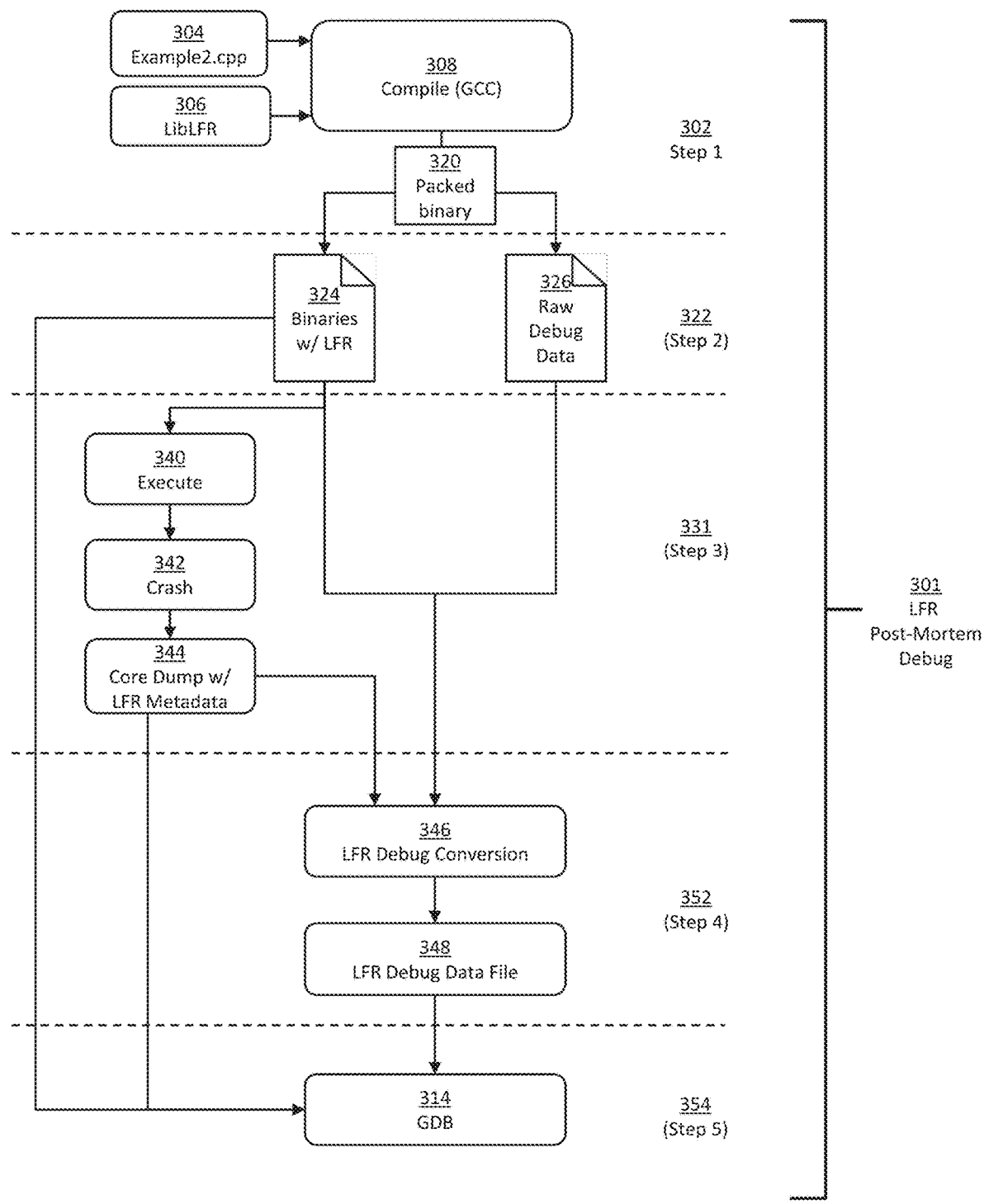
FIG. 11 shows the compilation and post-mortem debugging session of a transformed binary, in accordance with an embodiment of the present disclosure.

FIG. 11 shows the compilation and post-mortem debugging session 301 of a transformed binary. The source code of the program Example2.cpp (denoted 304) includes calls to one or more functions in LFR library 306 (named LibLFR). For example, Example2.cpp can include calls to randomize function 310 (a/k/a "Randomize ( )") and debug randomize function 312 (a/k/a "Debug_Randomize ( )") residing in LibLFR (not shown in FIG. 11). In FIG. 11, Example2.cpp and LibLFR are both shown as inputs to the GCC compiler 308. Compiler options (such as "-g" option and/or "-gdwarf-2" option) are passed as arguments to produce debugger information. It will be understood that the debugger information produced initially corresponds to the original debugging information prior to the transformation of the binary corresponding to Example2.cpp. At the output of step 1, the packed binary 320 is produced which includes the machine code corresponding to function blocks in Example2.cpp that are associated with LibLFR and relocation data describing a static arrangement of the function blocks in Example2.cpp along with their respective memory requirements. The packed binary 320 also includes symbol table information to debug the blocks of the original source code.

In step 2, the packed binary 320 is separated or divided into an executable code component (named binaries with LFR 324) and a debug data component (named raw debug data 326). Dividing the packed binary 320 into an executable code component and a debug data component can be equivalent to stripping the debugging information from the packed binary. The content remaining in the packed binary after stripping the debugging information is the executable binary. The executable code component can be the machine code corresponding to function blocks in Example2.cpp that are associated with LibLFR and relocation data describing a static arrangement of the function blocks in Example2.cpp along with their respective memory requirements. The debug data component (e.g., an object file) can include symbol table information to debug the blocks of the original source code. In some implementations, the executable code component can be processed further. For example, a .debug section information from the ELF header section of the executable code can be removed. As a result, the debug data component is removed from the executable code component. If the linkage between the executable code component and the debug data component is not removed, then a debugger (such as GDB 314) would load the debug data component which will lack the updated symbols necessary to debug Example2.cpp.

In step 3 (331), the executable code component is executed (step 340). Upon execution, the executable code component calls the randomize function 310 residing in the libLFR 306. The randomize function 310 performs the Load-time Function Randomization of the function blocks in Example2.cpp. As a result, memory locations (where portions of the machine code corresponding to Example2.cpp reside) are reorganized randomly. The randomly reorganized memory layout is based on subjecting the executable code component to a transformation defined in libLFR 306. A crash event 342 occurs at some point during execution of the executable code component. Following the crash event 342, the computer indicates the nature of the exception (such as segmentation fault) and creates (step 344) the core dump file. During step 3, an LFR metadata is created. The LFR metadata describes memory addresses where portions of the machine code corresponding to function blocks in Example2.cpp will reside. As the randomization event occurs prior to execution of the main ( ) function, in most cases the crash event 342 occurs after randomization and therefore the memory core dump 344 includes the LFR metadata. For example, the post randomization ELF symbols, the randomization seed value used by the randomize function 310, and/or current memory addresses (of the randomly reorganized memory layout) where the portions of the machine code corresponding to function blocks in Example2.cpp are stored in the memory core dump 344. The LFR metadata created is unique to the memory locations in which portions of the machine code corresponding to function blocks in Example2.cpp reside.

Because the information in the debug data component still points to the initial memory addresses (and not the randomly reorganized memory layout) of the portions of the machine code corresponding to function blocks in Example2.cpp, the information in the debug data component needs to be updated to correspond to the randomly reordered layout of the transformed binary. Accordingly, in some implementations, LFR debug conversion function 346 (a/k/a "LFR Debug Conversion ( )") residing in libLFR 306 is called during step 4 (step 352). LFR debug conversion function 346 generates an updated debug data file (named LFR debug data file 348) using (a) the symbol table information in the debug data component in step 2, (b) the relocation data in step 1, and (c) the randomization seed value. The LFR debug conversion function 346 can also format contents of the LFR debug data file 348 according to a specific format (e.g., DWARF format) of a database that stores the LFR debug data file 348. Thus, LFR debug data file 348 can be regarded as a transformed version of the debug data component and includes updated symbol table information corresponding to the randomly reorganized layout of the portions of the machine code. In step 5 (step 354), a post-mortem debugging session is established by calling a debugger program with the executable code component, the core dump file, and the LFR debug data file 348.

In some embodiments, the LFR debug data file 348 is received through the command line and saved to a storage medium. In a hypothetical example where the executable binary file is "Example2.exe", the core dump file is "core.Example2.1880", and the post-randomized debug file is "LFR_Example2.debug", then the GDB debugger for post-mortem debugging can be loaded using the command line instruction: "GDB-e Example.exe-c core.Example2.1880-s LFR_Example2.debug".

One benefit of post-mortem debugging is that the GDB debugger allows for stepping through the program stack backwards (via backtrace) frame-by-frame thereby unwinding the stack. Main ( ) makes up the initial or outermost stack frame; each additional call to a function adds a new stack frame, which is then eliminated or removed from the stack with each return. Available debug information for each stack frame includes the frame number (also called function name), source file name, line number, and any arguments passed to the function.

Figure 12:
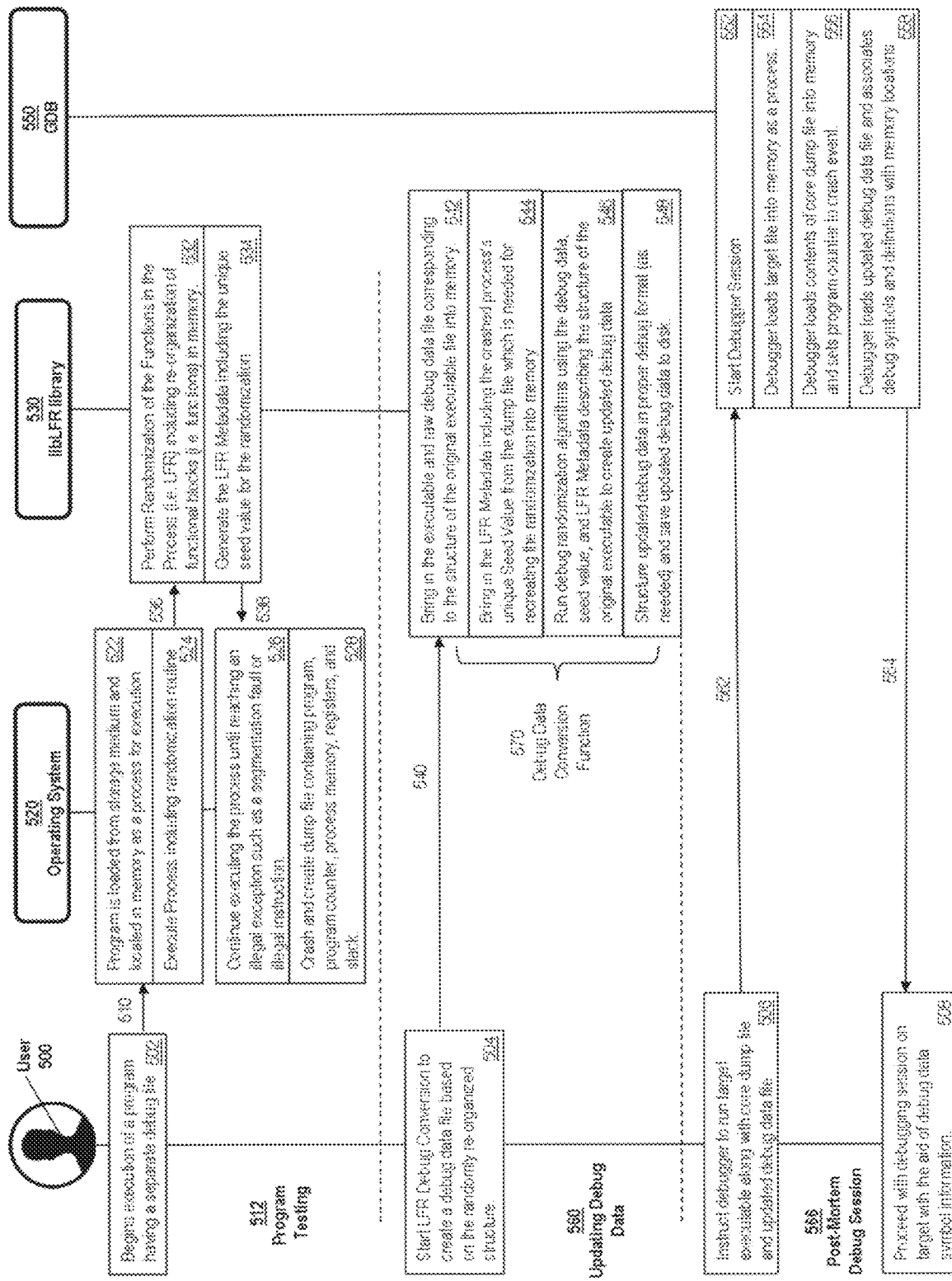
FIG. 12 shows a system communication diagram associated with post-mortem debugging of a transformed binary, in accordance with an embodiment of the present disclosure.

FIG. 12 shows a system communication diagram associated with post-mortem debugging of a transformed binary. The system communication diagram shown in FIG. 12 is from the perspective of the user 500, the operating system 520, the debugger GDB 550, and the randomization library named libLFR library 530. Additionally, the diagram is broken into three phases-program testing phase 512, updating debug data phase 560, and the post-mortem debug session phase 566. Although the diagram shows a user as initiating each phase of the diagram, steps of this diagram can be automated, for example, by establishing links or using scripts that automate the tasks in a sequential manner. As an example, a script may be written to automatically build the file from source code, launch the resulting executable program, build the associated debug data in response to crashing of the executable program, and/or launch the debugger to begin a post-mortem debug session.

During the program testing phase 512, the user 500 instructs the computer operating system 520 to begin execution of an executable program (block 502 and path 510). To support subsequent debug efforts, it is presumed that at this stage a debug data file corresponding to the executable program exists in memory. The operating system 520 loads the program from a storage medium, such as a hard drive, and organizes the program as a process into virtual memory for execution (block 522). At this point the operating system will also load any libraries, including libLFR 530, into virtual memory if they do not already exist. As the operating system 520 begins execution, it will immediately call the randomization routine (block 524 and path 536). The randomization routine exists in the libLFR library 530. The randomization routine reorganizes the functional blocks of the program residing in memory based on a binary transformation algorithm existing in the libLFR library 530 (block 532). Subsequently, the randomization routine further generates LFR metadata, which exists as process-specific memory, includes information pertinent to the immediate reorganization layout and the randomization seed value (block 534). Control then returns (path 538) to the operating system. The process continues execution until incurring an illegal exception, such as undefined instruction or illegal memory access (block 526). The exception causes the process to crash and produce a dump file that contains a randomly reorganized version of the program, program counter, process memory, registers, and stack (block 528).

As the program has been shuffled and reorganized by the randomization routine, the debug data file no longer corresponds to the in-process memory and must be updated for use by a debugger. The method of updating the debug data 560 as shown in FIG. 12 begins with the user 500 requesting (path 540) the libLFR library 530 to perform this task (block 504). As a library is not directly executable, it should be understood that an intermediary executable program may be called to pass the information from the user to the debug conversion function 570 within the libLFR library 530. The debug data conversion function 570 may require several inputs which are read into memory including the program file and raw debug data file corresponding to the original executable program file (block 542), and the dump file which contains the LFR metadata (block 544). Here, the LFR metadata contains process-specific information including the unique seed value used for the random reorganization, and/or information describing the reorganization, that is, the memory addresses of the reorganized functions of the process machine code. The program file includes relocation data which was created during compilation and was used as an input to the binary transformation. The debug data conversion function 570 then performs a binary transformation upon the debug data file using the relocation data, and LFR metadata and seed value specific to the crashed process to create updated debug data (block 546). The binary transformation of the debug data is similar to the binary transformation that was performed during the randomization of the functions (block 532) which produced the process-specific metadata. A final step is to structure the updated debug data in a format compliant with the debugger, such as DWARF format, and to save the updated debug data to disk (block 548).

The user 500 may now begin a post-mortem debug session 566. The user instructs (path 562) the debugger to run the target executable along with the core dump file and updated debug data file (block 506). In response, the debugger session starts (block 552) and loads the target executable into memory as a process (block 554). The debugger then loads the contents of the core dump file into memory and sets the program counter to the crash event (block 556). Finally, the debugger loads the updated debug file and associates debug symbols and definitions with memory locations (block 558). Control returns back to the user (path 564) to proceed with the debugging session on the target with aid of debug data symbol information (block 508).

The concept of a stack is well understood as a LIFO (last-in-first-out) linear memory organization system in computer architecture. Common nomenclature is to 'push' information onto the stack when writing data to the stack and 'popping' information from the stack when reading data from the stack. When calling functions or subroutines, the stack is used to pass arguments to the function and capture the return address of the caller. Due to page boundaries and memory organization techniques utilized by various computer architectures, the return address may be a shortened offset from a fixed address of the program rather than a complete physical or virtual address; however, the concepts presented herein include an example with the return address simply being the address of the caller.

Figure 13:
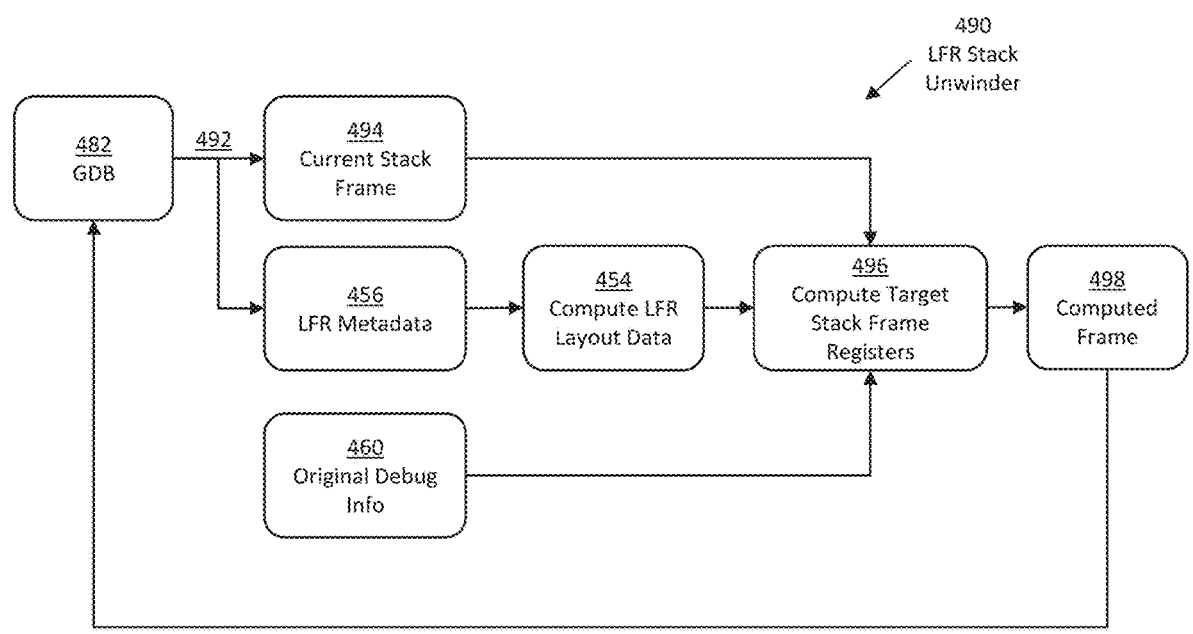
FIG. 13 shows the process of updating the stack frame for debugging a program with LFR, in accordance with an embodiment of the present disclosure.

FIG. 13 shows the flow and data required to generate the properly computed frame. In a very similar process to the LFR Debug Conversion, LFR_Stack_Unwinder patch 490 can compute information for any post-randomized frame 498 from the current stack frame 494 provided by GDB's Python API 492, LFR metadata 456, and original debug information 460. The eh_frame is part of the original debug information 460 in the diagram. The LFR metadata 456 includes, among other data, the randomization seed 458 required to compute the LFR layout data 454. With this layout data 454 and the original debug info 460, the LFR_Stack_Unwinder patch 490 is able to transform data in the current stack frame 494 to produce the final computed frame 498, which is returned to GDB 482.

The LFR_Stack_Unwinder patch 490 may be automatically loaded as a Python script through the debug_gdb_scripts ELF section. This section stores entries for script file paths. In some embodiments, the entry may be placed in the object file created by the LFR Debug Conversion by creating the debug_gdb_scripts inside the ELF section which includes the path to the script to it. The script and the path are managed by a custom deployment tool. When GDB loads an object file into memory, it will look for the debug_gdb_scripts, and, if it exists, it will load the script files into memory and is integrated into GDB through its Python API.

Figures 14A, 14B:
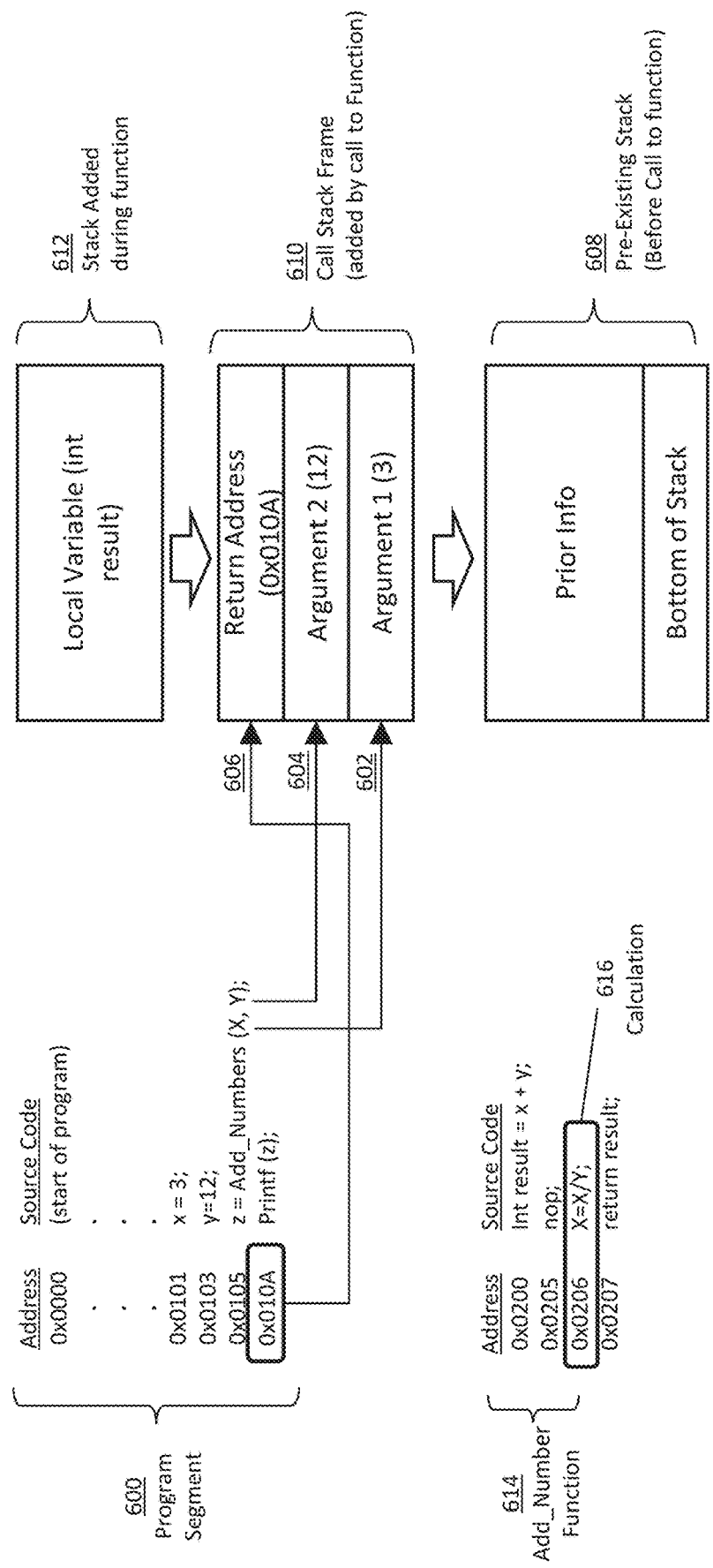
FIG. 14A shows an example of contents of a memory associated with a program for adding two numbers, in accordance with an embodiment of the present disclosure.
FIG. 14B shows an example of a stack in connection with execution of the program shown in FIG. 14A, in accordance with an embodiment of the present disclosure.

FIG. 14A shows an example of contents of a memory associated with a program for adding two numbers, in accordance with an embodiment of the present disclosure. FIG. 14B shows an example of a stack in connection with execution of the program shown in FIG. 14A, in accordance with an embodiment of the present disclosure. Specifically, FIG. 14A shows a program segment 600 including a call to a function that adds two numbers, "Add_Numbers (int x, int y)". FIG. 14B shows modifications to the stack as a result of execution of the program in FIG. 14A. During program execution, two variables, namely x and y, are assigned values 3 and 12. After the assignment, a call to the function Add_Numbers ( ) is made with the results stored in variable z at address 0x0105, and the results are printed at address 0x010A. Prior to making the call, the pre-existing stack 608 is shown in FIG. 14B. Upon making the call, the two arguments x and y are pushed onto the stack as indicated by 602 and 604, followed by the return address 606 of the caller being pushed onto the stack so that program execution knows where to continue operation within the program after the function completes the operation (e.g., "returns"). In this example, the combination of the augments and the return address are referred to as a stack frame or call stack frame 610.

The stack continues to grow upwards in a linear fashion as functions add local variables or make call other functions. In the example, the source code of Add_Number 614 is shown in FIG. 14A and, upon being called, space is allocated on the stack to contain the local variable "result" 612. After the computation is completed at address 0x0200, some additional steps are performed before the result is returned at 0x0207. As a result of the return, the stack memory used by the local variable 612 is released (e.g., popped from the stack), and subsequently the return address is copied to the program counter and the entirety of the call stack frame 610 is released from the stack. The program will continue at line 0x010A and the resulting stack will only contain the pre-existing stack 608.

When debugging, it is of particular use to walk backwards through a program and analyze the response of functions within the program given the original arguments that were passed to the function proceeding an event. This is made possible by walking backwards through the program and using the stack frames of the function calls to retrieve the arguments from a point when the function was originally called. This method of walking backwards through the stack to retrieve the arguments (e.g., popping the stack) is referred to as unwinding the stack. Conversely, placing information onto the stack (e.g., pushing) is referred to as winding the stack. During debugging, it is common to perform both winding and unwinding, and together they represent a concept of stepping through stack frames.

In continuing with the example shown in FIGS. 14A and 14B, if the value of y passed to the Add_Number Function 614 was zero, then program execution will have crashed at the calculation 616 due to division by zero. Upon inspection, the programmer may not be able to immediately recognize the cause of the error without the use of a debugger. Just prior to the crash event (e.g., line 0x0205), the programmer may unwind the stack to access the call stack frame 610 and restore the arguments x and y to then advance sequentially to understand how the zero value caused the program to crash.

When stepping through stack frames, the debugger essentially places a breakpoint at the address where a stack frame is pushed or popped. The breakpoint is handled as a processor exception, and the management of the exception as well as instructions for unwinding the stack reside in a section of the executable program and the debug object file called the eh_frame. Specifically, the eh_frame along with eh_frame_hdr (a/k/a eh_frame header) are sections used for handling exceptions and include tables which describe how to unwind the stack. Both sections are initially created during program build (e.g., compilation/linking) and exist in the ELF header of the executable or object file. Additionally, an additional static copy of the eh_frame is copied into the debug data file when the debug information is stripped from a packed binary. During loading (i.e., Load-Time), the eh_frame and header are brought into a writable portion of memory as in-process memory.

When used for unwinding the stack during debugging, the information existing in the table of the eh_frame provides instructions on how to restore the memory registers, such as those containing arguments passed to the function and return address, to their previous state from the call stack frame (e.g., the stack frame created in response to the function being called). The information contained in the tables is similar to the DIE of the debugger format described earlier. Specifically, the tables stored within the eh_frame section are the Call Frame Information (CFI) records; and the Call Frame Information is organized by the data structures defined by the Common Information Entry (CIE) format and the Frame Description Entry (FDE). These data structures include an entry specified within the CIE structure that provides instructions for restoring the memory register (a/k/a link register) used when unwinding the stack.

As stated, a static version of the eh_frame exists within the file on disk (a/k/a storage medium) and is copied into in-process memory. When performing a randomization or transformation of a binary program, the in-process memory version of the eh_frame is updated to reflect the post-transformation locations of the functions.

A deficiency currently existing in the GDB debugger becomes apparent while stepping through stack frames while performing either post-mortem or interactive debugging of transformed binaries. The root of the deficiency is that the GDB debugger has no ability to read the eh_frame instance from in-process memory. As such, the debugger is unaware of the relocations and as a result is unable to unwind the stack correctly when either debugging or handling exceptions (even though a program not under debugger control would). Essentially, when unwinding the stack during a debug session, the program counter values are read from the static eh_frame corresponding to a non-transformed arrangement of the executable program from disk causing GDB to be mapped incorrectly to the post-transformed locations, and thereby to respond incorrectly to requests for unwinding the stack. One embodiment of the inventive concept disclosed includes a patch which may be registered with the debugger through a command in the GDB debugger shell.

The patch implements custom stack unwinding in the GDB debugger utilizing the GDB Python API. Once registered with the debugger, the patch is launched in response to the GDB attempting to wind or unwind the current stack frame (a/k/a GDB stepping through the frames). If the current stack frame includes a return address which has been relocated during a program transformation, the current stack frame is updated to reflect the relocation and passed back to the debugger. This process is presented next as a flow diagram of the patch in FIG. 15.

Figure 15:
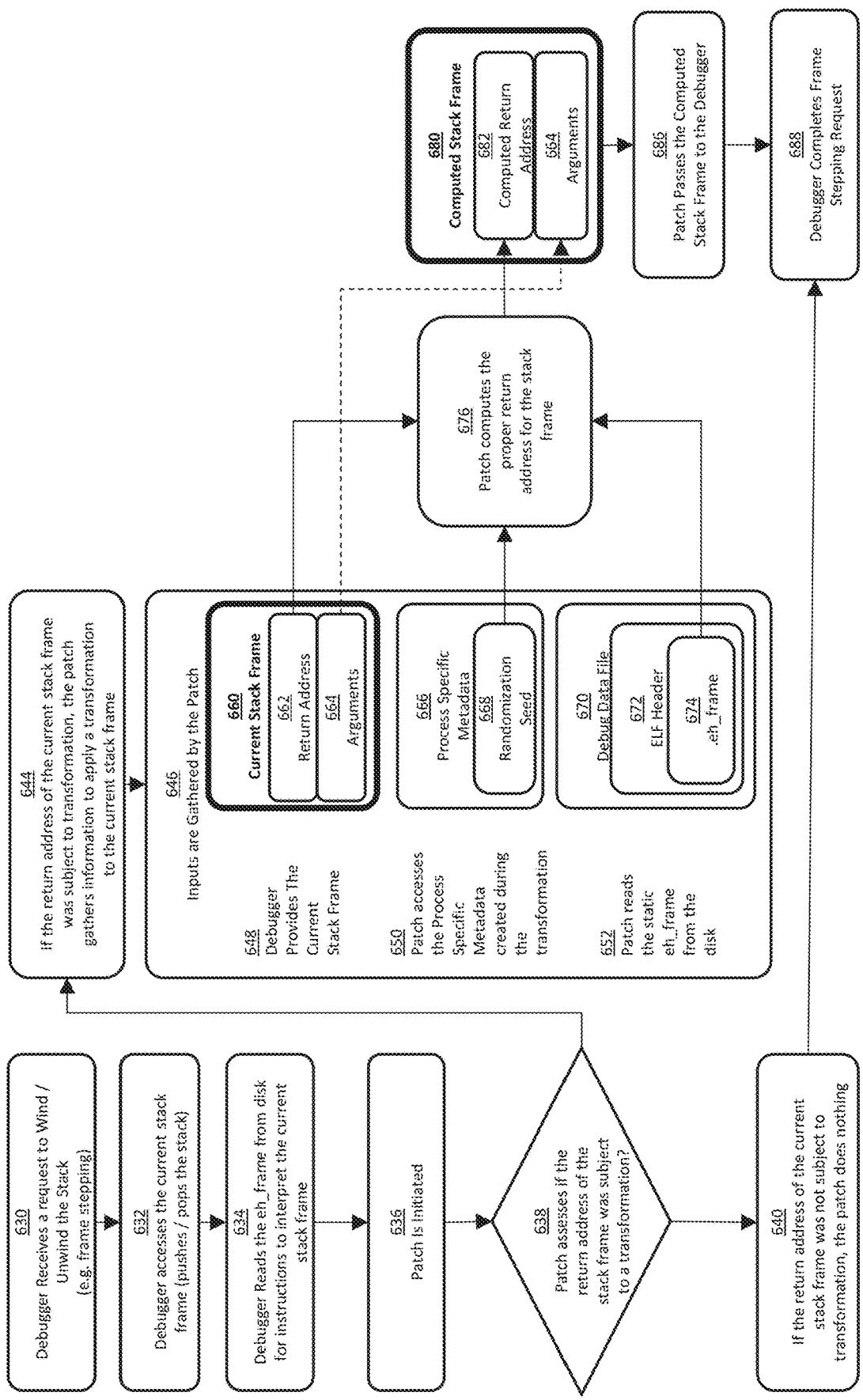
FIG. 15 shows a flow diagram in connection with updating a stack, in accordance with an embodiment of the present disclosure.

FIG. 15 shows a flow diagram in connection with updating a stack, in accordance with an embodiment of the present disclosure. The process in the flow diagram begins with the debugger receiving a request to wind or unwind the stack 630 (a/k/a frame stepping). The debugger accesses the current stack frame 632 from the stack. In the case of unwinding, to access the stack means to pop information from the stack and read the available stack frame. In the case of winding, to access the stack means to push a current stack frame into the stack. The debugger continues by reading the eh_frame 634 from the on-disk version for instructions on how to interpret (e.g., apply the format for structuring) the current stack frame for reading or writing. The patch, which is registered with debugger, is initiated 636 based on a trigger which may include either the debugger reading the stack frame 632 or the debugger reading the eh_frame from disk 634.

The patch begins by assessing if the return address of the current stack frame was subject to a transformation 638. A transformation may be limited to certain sections of memory, libraries, files, or functions. In the case where the return address was not a memory location which was subject to transformation 640, the patch does nothing and the current stack frame is passed to the debugger to complete the frame stepping request 688. In the case where the return address was included in a section of memory subject to transformation 644, the patch gathers information necessary to compute the proper return address 646.

To compute the proper return address and subsequently build a properly computed stack frame, the patch requires three inputs. The debugger provides the current stack frame to the patch 648, and the current stack frame 660 includes the return address 662 and the arguments 664. The patch accesses the process-specific metadata created during the transformation 650, and the process-specific metadata 666 includes the randomization seed 668 used for the transformation. Lastly, the patch reads the eh_frame 674 as it was created during the build (e.g., compile/linking) from the disk. Identical copies of the eh_frame 674 exist in the ELF header 672 of the debug data file 670, which was stripped from the packed binary, or alternatively, the ELF header of the executable binary file on disk. Upon gathering these inputs, the flow continues to block 676 where the patch computes the proper return address for the stack frame.

Computing the proper return address is similar to the process used in the LFR Debug Conversion in that the patch can compute information for the computed stack frame 680 from the current stack frame 660 and the eh_frame 674 by using the randomization seed 668 required to compute the transformation layout data. The output of the computation that occurs at block 676 is the computed stack frame 680. The computed stack frame includes the computed return address 682 and the arguments 664 which existed in the current stack frame. The patch then passes the computed stack frame to the debugger 686, and the debugger completes the frame stepping request 688.

As a method of applying and registering the patch with the debugger, the patch may be automatically loaded as a Python script through the .debug_gdb_scripts section of the ELF of the packed binary which stores entries for script file paths. In some embodiments, the entry may be placed in the debug data file created by the LFR Debug Conversion by creating the debug_gdb_scripts inside the ELF section which includes the path to the script to the debug data file, and wherein the script and the path may be managed by a custom deployment tool. When GDB loads an object file into memory, it will look for the debug_gdb_scripts, and, if they exist, it will load the script files into memory and is integrated into GDB through its Python API.

In one embodiment, the computations to produce the immediately requested call stack frame from the eh_frame may be performed and results provided on an as needed basis (i.e., take in the inputs and perform the transformation process each time the call stack frame is requested). In an alternative and preferred embodiment, the entirety of the eh_frame may be transformed once and stored in a lookup table, such that the computations of the transformation process are performed once and the results are available through a lookup table within the patch. In building a lookup table, it is further desirable to sort the results by address in a binary searchable fashion, such as in descending or ascending order by address.

Figure 16:
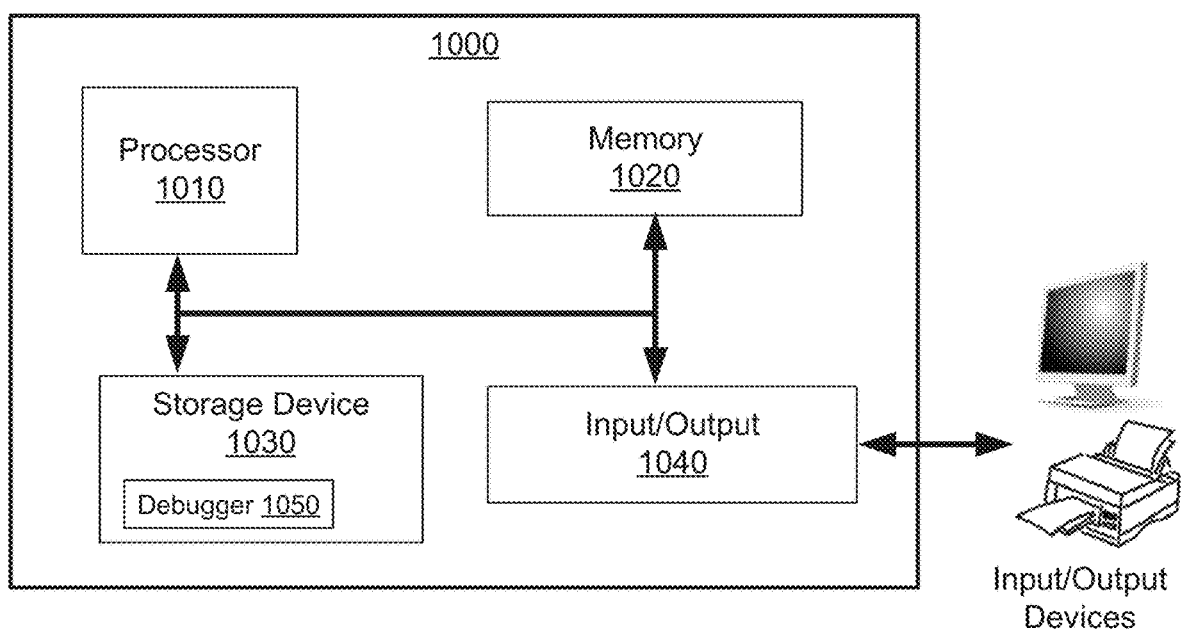
FIG. 16 is a block diagram showing some of the components typically incorporated in at least some of the computer systems and other devices on which the disclosed system operates in accordance with some embodiments of the present technology.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read-Only Memory (ROM), Random Access Memory (RAM), compact discs (CDs), digital versatile discs (DVD), etc. Therefore, the computer-readable media may include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes. For example, FIG. 16 discloses a computer system 1000, with storage device 1030 including a debugger program 1050 that can be any one of the debugger programs discussed above. The debugger program 1050 can be executed by a processor 1010 using memory 1020. A user can operate with the computer system 1000 via input/output devices connected to input/output interface 1040 in computer system 1000.

Some of the disclosed embodiments may be implemented as devices or modules using hardware circuits, software, or combinations thereof. For example, a hardware circuit implementation may include discrete analog and/or digital components that are, for example, integrated as part of a printed circuit board. Alternatively, or additionally, the disclosed components or modules may be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware, or firmware. The connectivity between the modules and/or components within the modules may be provided using any one of the connectivity methods and media that are known in the art, including, but not limited to, communications over the internet, wired, or wireless networks using the appropriate protocols.

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments. The embodiments discussed herein were chosen and described in order to explain the principles and the nature of various embodiments and its practical application to enable one skilled in the art to utilize the present invention in various embodiments and with various modifications as are suited to the particular use contemplated. The features of the embodiments described herein may be combined in all possible combinations of methods, apparatus, modules, systems, and computer program products.

What is claimed is:

1. A method to debug software that is protected by a cybersecurity technique in which executable code is pseudorandomly reorganized in memory, the method comprising:
    loading an executable code component corresponding to a packed binary file into memory, the executable code component including machine code that corresponds to blocks of original source code;
    in response to a request for executing the executable code component, generating a pseudorandomly reorganized layout of the machine code corresponding to the blocks of the original source code based on subjecting the executable code component to a transformation defined in a function randomization library corresponding to the blocks of original source code;
    in response to a crash event associated with the executing of the pseudorandomly reorganized machine code, receiving a core dump file corresponding to the crash event, the core dump file including information related to memory addresses of the pseudorandomly reorganized layout where portions of the machine code are stored at a time of the crash event;
    receiving a debug data file including symbol table information to debug the blocks of the original source code generated prior to the pseudorandomly reorganized layout;
    generating an updated debug data file by using the debug data file, wherein the updated debug data file includes symbol table information corresponding to the pseudorandomly reorganized layout based on the information related to the memory addresses of the pseudorandomly reorganized layout at the time of the crash event; and establishing a post-mortem debugging session by calling a debugger program with the executable code component, the core dump file, and the updated debug data file.

2. The method of claim 1, wherein the debug data file is generated by extracting a debug data component, which includes the symbol table information to debug the blocks of the original source code, from the packed binary file and placing the debug data component into the debug data file.

3. The method of claim 1, further comprising:
generating, prior to the generating of the pseudorandomly reorganized layout, process-specific metadata that uniquely describes a first set of memory locations where the machine code corresponding to the blocks of the original source code reside; and
updating the first set of memory locations in the process-specific metadata to a second set of memory locations based on the pseudorandomly reorganized layout of the machine code,
wherein the second set of memory locations are generated based on a randomization seed value associated with the randomly reorganized layout that is stored in the core dump file.

4. The method of claim 3, further comprising:
using a pseudorandom number generator to generate the randomization seed value; and
storing the randomization seed value in the process-specific metadata prior to the updating of the process-specific metadata.

5. The method of claim 4, wherein the pseudorandom number generator is configured to simulate deterministic randomization events such that the pseudorandomly reorganized layout of the machine code is repeatable over time for a same randomization seed value.

6. The method of claim 3, wherein the transformation uses relocation data in the executable code component describing a static arrangement of the blocks of source code and memory requirements of the blocks of the original source code, the randomization seed value, and the process-specific metadata.

7. A method to debug software that is reorganized in memory, the method comprising:
loading an executable code component corresponding to a packed binary file into memory, the executable code component including machine code that corresponds to blocks of original source code;
in response to a request for executing the executable code component, generating a randomly reorganized layout of the machine code corresponding to the blocks of the original source code based on subjecting the executable code component to a transformation defined in a function randomization library corresponding to the blocks of original source code;
in response to a crash event associated with the executing of the executable code component, receiving a core dump file corresponding to the crash event;
receiving a debug data file including symbol table information to debug the blocks of the original source code that is generated prior to the randomly reorganized layout;
generating an updated debug data file by using the debug data file, wherein the updated debug data file includes symbol table information corresponding to the randomly reorganized layout; and
establishing a post-mortem debugging session by calling a debugger program with the executable code component, the core dump file, and the updated debug data file,
wherein the core dump file includes a randomization seed value associated with the randomly reorganized layout and process-specific metadata describing memory locations where the machine code corresponding to the blocks of the original source code reside, and
wherein creating the updated debug data file includes,
reading the debug data file, the executable code component, and the randomization seed value included in the core dump file, and
applying the transformation defined in the function randomization library to generate contents of the updated debug data file.

8. A non-transitory computer-readable storage medium comprising instructions that, when executed by a processing device, cause the processing device to:
load an executable code component corresponding to a packed binary file into memory, the executable code component including machine code that corresponds to blocks of original source code;
in response to a request for executing the executable code component, generate a pseudorandomly reorganized layout of the machine code corresponding to the blocks of the original source code based on subjecting the executable code component to a transformation defined in a function randomization library corresponding to the blocks of original source code;
in response to a crash event associated with the executing of the pseudorandomly reorganized machine code, receive a core dump file corresponding to the crash event, the core dump file including information related to memory addresses of the pseudorandomly reorganized layout where portions of the machine code are stored at a time of the crash event;
receive a debug data file including symbol table information to debug the blocks of the original source code generated prior to the pseudorandomly reorganized layout;
generate an updated debug data file by using the debug data file, wherein the updated debug data file includes symbol table information corresponding to the pseudorandomly reorganized layout based on the information related to the memory addresses of the pseudorandomly reorganized layout at the time of the crash event; and
establish a post-mortem debugging session by calling a debugger program with the executable code component, the core dump file, and the updated debug data file.

9. The non-transitory computer-readable storage medium of claim 8, wherein the debug data file is generated by extracting a debug data component, which includes the symbol table information to debug the blocks of the original source code, from the packed binary file and placing the debug data component into the debug data file.

10. The non-transitory computer-readable storage medium of claim 8, further comprising instructions that cause the processing device to:
generate, prior to the generating of the pseudorandomly reorganized layout, process-specific metadata that uniquely describes a first set of memory locations where the machine code corresponding to the blocks of the original source code reside; and update the first set of memory locations in the process-specific metadata to a second set of memory locations based on the pseudorandomly reorganized layout of the machine code, wherein the second set of memory locations are generated based on a randomization seed value associated with the randomly reorganized layout that is stored in the core dump file.

11. The non-transitory computer-readable storage medium of claim 10, further comprising instructions that cause the processing device to:

use a pseudorandom number generator to generate the randomization seed value; and store the randomization seed value in the process-specific metadata prior to the updating of the process-specific metadata.

12. The non-transitory computer-readable storage medium of claim 11, wherein the pseudorandom number generator is configured to simulate deterministic randomization events such that the pseudorandomly reorganized layout of the machine code is repeatable over time for a same randomization seed value.

13. The non-transitory computer-readable storage medium of claim 10, wherein the transformation uses relocation data in the executable code component describing a static arrangement of the blocks of source code and memory requirements of the blocks of the original source code, the randomization seed value, and the process-specific metadata.

14. A non-transitory computer-readable storage medium comprising instructions that, when executed by a processing device, cause the processing device to:

load an executable code component corresponding to a packed binary file into memory, the executable code component including machine code that corresponds to blocks of original source code;

in response to a request for executing the executable code component, generate a randomly reorganized layout of the machine code corresponding to the blocks of the original source code based on subjecting the executable code component to a transformation defined in a function randomization library corresponding to the blocks of original source code;

in response to a crash event associated with the executing of the executable code component, receive a core dump file corresponding to the crash event;

receive a debug data file including symbol table information to debug the blocks of the original source code that is generated prior to the randomly reorganized layout;

generate an updated debug data file by using the debug data file, wherein the updated debug data file includes symbol table information corresponding to the randomly reorganized layout; and establish a post-mortem debugging session by calling a debugger program with the executable code component, the core dump file, and the updated debug data file, wherein the core dump file includes a randomization seed value associated with the randomly reorganized layout and process-specific metadata describing memory locations where the machine code corresponding to the blocks of the original source code reside, and wherein creating the updated debug data file includes, reading the debug data file, the executable code component, and the randomization seed value included in the core dump file, and applying the transformation defined in the function randomization library to generate contents of the updated debug data file.

15. A system to debug software that is reorganized in memory, the system comprising:

a memory; and a processing device, operatively coupled with the memory component, to:

load an executable code component corresponding to a packed binary file into memory, the executable code component including machine code that corresponds to blocks of original source code, in response to a request for executing the executable code component, generate a pseudorandomly reorganized layout of the machine code corresponding to the blocks of the original source code based on subjecting the executable code component to a transformation defined in a function randomization library corresponding to the blocks of original source code, in response to a crash event associated with the executing of the pseudorandomly reorganized machine code, receive a core dump file corresponding to the crash event, the core dump file including information related to memory addresses of the pseudorandomly reorganized layout where portions of the machine code are stored at a time of the crash event, receive a debug data file including symbol table information to debug the blocks of the original source code generated prior to the pseudorandomly reorganized layout, generate an updated debug data file by using the debug data file, wherein the updated debug data file includes symbol table information corresponding to the pseudorandomly reorganized layout based on the information related to the memory addresses of the pseudorandomly reorganized layout at the time of the crash event, and establish a post-mortem debugging session by calling a debugger program with the executable code component, the core dump file, and the updated debug data file.

16. The system of claim 15, wherein the debug data file is generated by extracting a debug data component, which includes the symbol table information to debug the blocks of the original source code, from the packed binary file and placing the debug data component into the debug data file.

17. A system to debug software that is reorganized in memory, the system comprising:

a memory; and a processing device, operatively coupled with the memory component, to:

load an executable code component corresponding to a packed binary file into memory, the executable code component including machine code that corresponds to blocks of original source code, in response to a request for executing the executable code component, generate a randomly reorganized layout of the machine code corresponding to the blocks of the original source code based on subjecting the executable code component to a transformation defined in a function randomization library corresponding to the blocks of original source code, in response to a crash event associated with the executing of the executable code component, receive a core dump file corresponding to the crash event, receive a debug data file including symbol table information to debug the blocks of the original source code that is generated prior to the randomly reorganized layout, generate an updated debug data file by using the debug data file, wherein the updated debug data file includes symbol table information corresponding to the randomly reorganized layout, and establish a post-mortem debugging session by calling a debugger program with the executable code component, the core dump file, and the updated debug data file, wherein the core dump file includes a randomization seed value associated with the randomly reorganized layout and process-specific metadata describing memory locations where the machine code corresponding to the blocks of the original source code reside, and wherein, in creating the updated debug data file includes, the processing device is used to, read the debug data file, the executable code component, and the randomization seed value included in the core dump file, and apply the transformation defined in the function randomization library to generate contents of the updated debug data file.

18. The system of claim 15, wherein the processing device is used to, generate, prior to the generating of the pseudorandomly reorganized layout, process-specific metadata that uniquely describes a first set of memory locations where the machine code corresponding to the blocks of the original source code reside; and update the first set of memory locations in the process-specific metadata to a second set of memory locations based on the pseudorandomly reorganized layout of the machine code, wherein the second set of memory locations are generated based on a randomization seed value associated with the randomly reorganized layout that is stored in the core dump file.

19. The system of claim 18, wherein a pseudorandom number generator is used to generate the randomization seed value, and store the randomization seed value in the process-specific metadata prior to the updating of the process-specific metadata, and wherein the pseudorandom number generator is configured to simulate deterministic randomization events such that the pseudorandomly reorganized layout of the machine code is repeatable over time for a same randomization seed value.

20. The system of claim 17, wherein the transformation uses relocation data in the executable code component describing a static arrangement of the blocks of source code and memory requirements of the blocks of the original source code, the randomization seed value, and the process-specific metadata.

* * * * *